US012399609B2

(12) United States Patent
Rathod

(10) Patent No.: US 12,399,609 B2
(45) Date of Patent: Aug. 26, 2025

(54) INSTALLING WEB APPLICATION AS STANDALONE APPLICATION IN THE CLIENT DEVICE

(71) Applicant: ProgwebT LLC, Dover, DE (US)

(72) Inventor: Yogesh Rathod, Mumbai (IN)

(73) Assignee: ProgwebT LLC, Dover, DE (US)

( * ) Notice: Subject to any disclaimer, the term of this patent is extended or adjusted under 35 U.S.C. 154(b) by 0 days.

(21) Appl. No.: 18/426,837

(22) Filed: Jan. 30, 2024

(65) Prior Publication Data

US 2024/0168620 A1 May 23, 2024

Related U.S. Application Data

(63) Continuation of application No. 18/100,163, filed on Jan. 23, 2023, now Pat. No. 11,886,693, which is a (Continued)

(51) Int. Cl.

*H04L 12/00* (2006.01)
*G06F 3/0481* (2022.01)

(Continued)

(52) U.S. Cl.

CPC ........ *G06F 3/04847* (2013.01); *G06F 3/0481* (2013.01); *G06F 3/04842* (2013.01);

(Continued)

(58) Field of Classification Search

CPC ............... G06F 3/04847; G06F 3/0481; G06F 3/04842; G06F 9/451; H04L 67/02; H04L 67/10

(Continued)

(56) References Cited

U.S. PATENT DOCUMENTS

| | | | |
|---|---|---|---|
| 6,075,531 A | 6/2000 | DeStefano | |
| 6,473,794 B1 | 10/2002 | Gubeen et al. | |

(Continued)

FOREIGN PATENT DOCUMENTS

| | | |
|---|---|---|
| WO | 2006059343 A2 | 6/2006 |
| WO | 2007052285 A2 | 5/2007 |
| WO | 2012131429 A2 | 10/2012 |

OTHER PUBLICATIONS

T*encent Technology* (*Shenzhen*) *Co. Ltd.* Petitioner U.S. Appl. No. 16/354,371, Petition, v. *Yogesh Rathod*, Respondent U.S. Pat. No. 10,990,265, Patent Owner. DER2022-00002, 12 pgs., Aug. 23, 2022.

(Continued)

*Primary Examiner* — Frantz Coby
(74) *Attorney, Agent, or Firm* — BEKIARES ELIEZER LLP

(57) ABSTRACT

Aspects of the disclosure provide a method, a system and an apparatus for web application publishing and installing. The storage medium stores web application programs that are downloaded via the network interface. Enabling, by the server system, publishing or listing of one or more applications for making applications accessible, searchable and installable for users. In response to receiving, by the server system, instruction to install selected application, retrieving and storing in a local storage medium selected application associated one or more interfaces including each interface associated interface data and installing and configuring application, in a client device, for enabling user to select application and open or invoke selected application associated one or more interfaces.

44 Claims, 6 Drawing Sheets

Related U.S. Application Data continuation of application No. 17/384,823, filed on Jul. 26, 2021, now Pat. No. 11,681,425, which is a continuation of application No. 15/008,483, filed on Jan. 28, 2016, now Pat. No. 10,310,723, which is a continuation of application No. PCT/IB2013/056314, filed on Aug. 1, 2013.

(51) Int. Cl.
*G06F 3/04842* (2022.01)
*G06F 3/04847* (2022.01)
*G06F 9/451* (2018.01)
*H04L 7/02* (2006.01)
*H04L 67/02* (2022.01)
*H04L 67/10* (2022.01)

(52) U.S. Cl.
CPC ................ *G06F 9/451* (2018.02); *H04L 7/02* (2013.01); *H04L 67/02* (2013.01); *H04L 67/10* (2013.01)

(58) Field of Classification Search
USPC .................................. 715/747, 705; 709/223
See application file for complete search history.

(56) References Cited

U.S. PATENT DOCUMENTS 6,519,571 B1 2/2003 Guheen et al.
6,536,037 B1 3/2003 Guheen et al.
6,546,002 B1 4/2003 Kim
6,580,440 B1 6/2003 Wagner et al.
6,615,166 B1 9/2003 Guheen et al.
6,721,713 B1 4/2004 Guheen et al.
6,769,123 B1 7/2004 Chan
6,846,239 B2 1/2005 Washio
6,950,850 B1 9/2005 Leff et al.
6,957,186 B1 10/2005 Guheen et al.
6,996,599 B1 2/2006 Anders et al.
7,035,912 B2 4/2006 Arteaga
7,043,505 B1 5/2006 Teague et al.
7,051,282 B2 5/2006 Marcjan
7,165,041 B1 1/2007 Guheen et al.
7,168,042 B2 1/2007 Braun et al.
7,269,621 B2 9/2007 Chang et al.
7,310,801 B2 12/2007 Burkhardt et al.
7,315,826 B1 1/2008 Guheen et al.
7,478,142 B1 1/2009 Veditz
7,536,372 B2 5/2009 Cox et al.
7,702,719 B1 4/2010 Betz et al.
7,752,328 B2 7/2010 Mortimore, Jr. et al.
7,814,234 B2 10/2010 Hawkins et al.
7,886,276 B2 2/2011 Tai et al.
7,913,248 B1 3/2011 Lynch et al.
7,930,646 B2 4/2011 De Souza Sana et al.
8,112,502 B2 2/2012 Emmelmann
8,121,874 B1 2/2012 Guheen et al.
8,190,703 B2 5/2012 Lin et al.
8,200,962 B1 6/2012 Boodman et al.
8,255,494 B1 8/2012 Boodman et al.
8,271,889 B1 9/2012 Beckert et al.
8,281,410 B1 10/2012 Sobel et al.
8,352,967 B2 1/2013 Labour et al.
8,516,037 B2 8/2013 Beisiegel et al.
8,522,249 B2 8/2013 Beaule
8,601,468 B1 * 12/2013 Boodman ........... G06F 11/0766 717/176
8,626,919 B1 1/2014 Papakipos et al.
8,645,944 B2 2/2014 Mechelke et al.
8,667,487 B1 3/2014 Boodman et al.
8,756,617 B1 6/2014 Boodman et al.
8,839,233 B2 9/2014 Kaegi
8,849,957 B1 * 9/2014 Boodman ........... G06F 16/9566 709/219
8,863,232 B1 * 10/2014 Tidd ...................... G06F 16/176 726/4
8,935,755 B1 1/2015 Kay
8,984,426 B2 3/2015 Endoh et al.
9,053,337 B2 6/2015 Carrara et al.
9,158,563 B2 10/2015 Hoff et al.
9,181,760 B2 11/2015 Feinstein
9,239,817 B2 1/2016 Claux et al.
9,280,677 B1 3/2016 Perry et al.
9,294,554 B2 3/2016 Mandel et al.
9,329,851 B2 5/2016 Lalmalani et al.
9,348,663 B1 5/2016 Boodman et al.
9,355,120 B1 5/2016 Silk et al.
9,680,964 B2 6/2017 Shukla et al.
9,819,725 B1 * 11/2017 Fedronic ............... H04L 67/025
9,870,116 B1 1/2018 Yasskin
10,025,574 B1 * 7/2018 Sargent ..................... G06F 8/61
10,031,657 B2 7/2018 Feinstein
10,310,723 B2 * 6/2019 Rathod ............... G06F 3/04842
10,567,543 B1 2/2020 Boodman et al.
10,740,302 B2 8/2020 Silk et al.
10,990,265 B2 4/2021 Rathod
11,119,812 B2 9/2021 Hu et al.
11,132,116 B2 9/2021 Rathod
11,681,425 B2 * 6/2023 Rathod ..................... H04L 7/02 709/200
11,799,984 B2 10/2023 Boodman et al.
11,886,693 B2 * 1/2024 Rathod ................... G06F 9/451
2001/0029605 A1 10/2001 Forbes et al.
2003/0097318 A1 5/2003 Yu et al.
2004/0003390 A1 1/2004 Canter et al.
2004/0078293 A1 4/2004 Iverson et al.
2004/0127190 A1 7/2004 Hansson et al.
2005/0102474 A1 5/2005 Lakshmanamurthy et al.
2005/0278723 A1 12/2005 Feinleib et al.
2006/0031833 A1 * 2/2006 Huang .................. G06F 9/4484 712/E9.082
2006/0036941 A1 2/2006 Neil
2006/0047665 A1 3/2006 Neil
2006/0075397 A1 4/2006 Kasahara
2006/0117310 A1 6/2006 Daniels et al.
2006/0142087 A1 6/2006 Chang et al.
2006/0155790 A1 7/2006 Jung et al.
2006/0156354 A1 7/2006 Jung et al.
2006/0184880 A1 8/2006 Bala
2007/0033569 A1 2/2007 Davidson et al.
2007/0049371 A1 3/2007 Yang
2007/0097130 A1 5/2007 Margulis
2007/0105627 A1 5/2007 Campbell
2007/0150478 A1 6/2007 Cho et al.
2007/0174824 A1 7/2007 Relyea et al.
2007/0239731 A1 10/2007 Graf et al.
2007/0265094 A1 11/2007 Tone et al.
2008/0071886 A1 3/2008 Ashton et al.
2008/0096656 A1 4/2008 LeMay et al.
2008/0096668 A1 4/2008 Yoshioka
2008/0104195 A1 5/2008 Hawkins et al.
2008/0148298 A1 6/2008 Chatterjee et al.
2008/0222628 A1 9/2008 Batra et al.
2008/0256599 A1 10/2008 Lee et al.
2009/0031301 A1 1/2009 D'Angelo et al.
2009/0113419 A1 4/2009 Ansari et al.
2009/0170607 A1 7/2009 Chiao et al.
2009/0209350 A1 8/2009 Kelly et al.
2009/0240728 A1 9/2009 Shukla et al.
2009/0240935 A1 9/2009 Shukla
2009/0259744 A1 10/2009 Kolke et al.
2009/0271707 A1 10/2009 Lin et al.
2009/0288080 A1 11/2009 Partridge et al.
2010/0071075 A1 3/2010 Slater, Jr.
2010/0077444 A1 3/2010 Forristal
2010/0107152 A1 * 4/2010 Kwon ....................... G06F 8/60 717/174
2010/0199181 A1 8/2010 Robertson et al.
2010/0281107 A1 11/2010 Fallows et al.
2011/0126111 A1 5/2011 Gill et al.
2011/0177866 A1 7/2011 Kim
2011/0213655 A1 9/2011 Henkin et al.

(56) References Cited

U.S. PATENT DOCUMENTS

| | | | | |
|---|---|---|---|---|
| 2012/0047520 | A1* | 2/2012 | Annapragada | G06F 9/542 719/318 |
| 2012/0096071 | A1* | 4/2012 | Murphey | G06F 8/71 709/203 |
| 2012/0173657 | A1 | 7/2012 | Ozzie et al. | |
| 2012/0216243 | A1 | 8/2012 | Gill et al. | |
| 2012/0224057 | A1 | 9/2012 | Gill et al. | |
| 2012/0246701 | A1 | 9/2012 | Swamy et al. | |
| 2012/0278750 | A1 | 11/2012 | Abraham et al. | |
| 2013/0060905 | A1 | 3/2013 | Mickens et al. | |
| 2013/0089273 | A1* | 4/2013 | Everingham | G06F 16/58 382/305 |
| 2013/0132861 | A1 | 5/2013 | Kienzle et al. | |
| 2013/0145361 | A1 | 6/2013 | Kaegi | |
| 2013/0218954 | A1* | 8/2013 | Kaegi | G06F 9/445 709/203 |
| 2013/0318208 | A1 | 11/2013 | Seshadri et al. | |
| 2014/0025949 | A1 | 1/2014 | Kay et al. | |
| 2014/0040870 | A1 | 2/2014 | Lynch et al. | |
| 2014/0047360 | A1 | 2/2014 | Kay et al. | |
| 2014/0075455 | A1* | 3/2014 | Annapragada | G06F 9/542 719/318 |
| 2014/0095638 | A1 | 4/2014 | Chen | |
| 2014/0101676 | A1* | 4/2014 | Lovegrove | G06F 9/542 719/328 |
| 2014/0122257 | A1* | 5/2014 | Avner | G06Q 30/0277 705/14.73 |
| 2014/0164108 | A1* | 6/2014 | Saari | G06Q 20/322 705/26.1 |
| 2014/0258970 | A1* | 9/2014 | Brown | G06F 8/47 717/103 |
| 2014/0280577 | A1* | 9/2014 | Beechuk | H04L 67/10 709/204 |
| 2015/0113375 | A1 | 4/2015 | Li et al. | |
| 2015/0120821 | A1 | 4/2015 | Bendell | |
| 2015/0134694 | A1 | 5/2015 | Burke et al. | |
| 2015/0205489 | A1* | 7/2015 | Murphy | H04L 51/212 715/764 |
| 2015/0207852 | A1 | 7/2015 | Boodman et al. | |
| 2015/0317143 | A1 | 11/2015 | Huang | |
| 2016/0162172 | A1 | 6/2016 | Rathod | |
| 2016/0191645 | A1 | 6/2016 | Hayton et al. | |
| 2016/0373805 | A1 | 12/2016 | Hogeg et al. | |
| 2022/0247833 | A1 | 8/2022 | Boodman et al. | |
| 2023/0221851 | A1 | 7/2023 | Rathod | |

OTHER PUBLICATIONS

Third-Party Submission Under 37 CFR 1.290 Concise Description of Relevance—U.S. Appl. No. 16/354,371, 35 pgs., Nov. 23, 2021.

Non-Final Action of U.S. Appl. No. 16/354,371, filed Dec. 7, 2021. Support for each claim, 21 pgs., Jan. 23, 2023.

Mini Program, Apply for an account | Weixin public doc, https://developers.weixin.qq.com/miniprogram/en/dev/+&cd=2&hl=en&ct=clnk&gl=in, 4 pgs. (Retrieved: Nov. 29, 2021).

Warren, "Android Instant Appls", https://mashable.com/article/android-instant, May 18, 2016, 2 pgs.

Wang et al., "Design and Implementation of WeChat Mini Program for University Dormitory Based on SOA", https://iopscience.iop.org/article/10.1088/1742-6596/1069/012086/pdf, ISAI 2018, IOP Publishing, IOP Conf. Series: Journal of Physics: Conference Series 1069 012086 doi: 10.1088/1742-6596/1069/1/012086, 9 pgs.

Okrah, "Hybrid Mobile Applications (Hybrid App)", Top Javascript Frameworks for Native Mobile Apps 2019, https://medium.com/@adolfokrah/top-javascript-frameworks-for-native-mobile-apps-2019-5e43cc4166df, 12 pgs.

The history of PWA development, https://www.divante.com/pwabook/chapter/02-the-history-of-pwas, 8 pgs. (Retrieved: Nov. 29, 2021).

History of Progressive Web Apps, by ScandiPWA, https://medium.com/progressivewebapps/history-of-progressive-web-apps-4c912533a531, 9 pgs. (Retrieved: Nov. 29, 2021).

Osmani, "Getting Started with Progressive Web Apps", https://developers.google.com/web/updates/2015/12/getting-started-pwa, 25 pgs. (Retrieved: Nov. 29, 2021).

Service Workers, (W3C First Public Working Draft May 8, 2014), https://www.w3.org/TR/2014/WD-service-workers-20140508/, 32 pgs, (Retrieved: Nov. 29, 2021).

Osmani, "The App Shell Model", https://developers.google.com/web/fundamentals/architecture/app-shell, 9 pgs. (Retrieved: Nov. 29, 2021).

Nyman, "Progress report on cross-platofrm Open Web Apps", https://hacks.mozilla.org/2013/10/progress-report-on-cross-platform-open-web-aps/, Oct. 28, 2013, 22 pgs.

Firefox OS Enables App Discovery without Download and Firefox Marketplace Unlocks the Power of Web Appls on Mobile Phones, https://blog.mozilla.org/press/2013/02/Firefox-Marketplac/, Feb. 24, 2012, 7 pgs.

Wikipedia, "Web Worker", https://en.wikipedia.org/wiki/Web_worker, 4 pgs. (Retrieved: Nov. 29, 2021).

Wikipedia, "Apache Cordova", https://en.wikipedia.org/wiki/Apache_Cordova, 6 pgs. (Retrieved: Nov. 29, 2021).

Netkow, "Hybrid Mobile Apps are Overtaking Native", https://blog.phonegap.com/hybrid-mobile-apps-are-overtaking-native-951a3aacacd1, Jul. 25, 2017, 13 pgs.

Russell, "Progressive Web Apps: Escaping Tabs Without Losing Our Soul", https://infrequently.org/2015/06/progressive-apps-escaping-tabs-without-losing-our-soul/, Jun. 15, 2015 7 pgs.

Packaged Apps, https://developer.chrome.com/docs/extensions/apps/, Published: Sep. 17, 2012/Updated: Nov. 17, 2014, 6 pgs.

Firefox OS app beginners tutorial, https://developer.mozilla.org.cach3.com/en-US-Apps/Build/Building_apps_for_Firefox_OS/Firefox_OS_app_beginners_tutorial, 6 pgs. (Retrieved: Nov. 29, 2021).

Wikipedia, "Smart Client", https://en.wikipedia.org/wiki/Smart_client, Nov. 11, 2020, 2 pgs.

Wikipedia, "Microsoft Silverlight", https://en.wikipedia.org/wiki/Microsoft_Silverlight, 15 pgs. (Retrieved: Nov. 29, 2021).

Wikipedia, "Adobe AIR", https://en.wikipedia.org/wiki/Adobe_AIR, 11 pgs. (Retrieved: Nov. 29, 2021).

10 Most Popular Software Architectural Patterns, NIX United, https://nix-united.com/blog/10-common-software-architectural-patterns-part-1, 27 pgs. (Retrieved: Nov. 29, 2021).

Prism—MozillaWiki website, https://wiki.mozilla.org/Prism, Retrieved: Mar. 23, 2025 (last edited on May 19, 2011), 10 pgs.

* cited by examiner

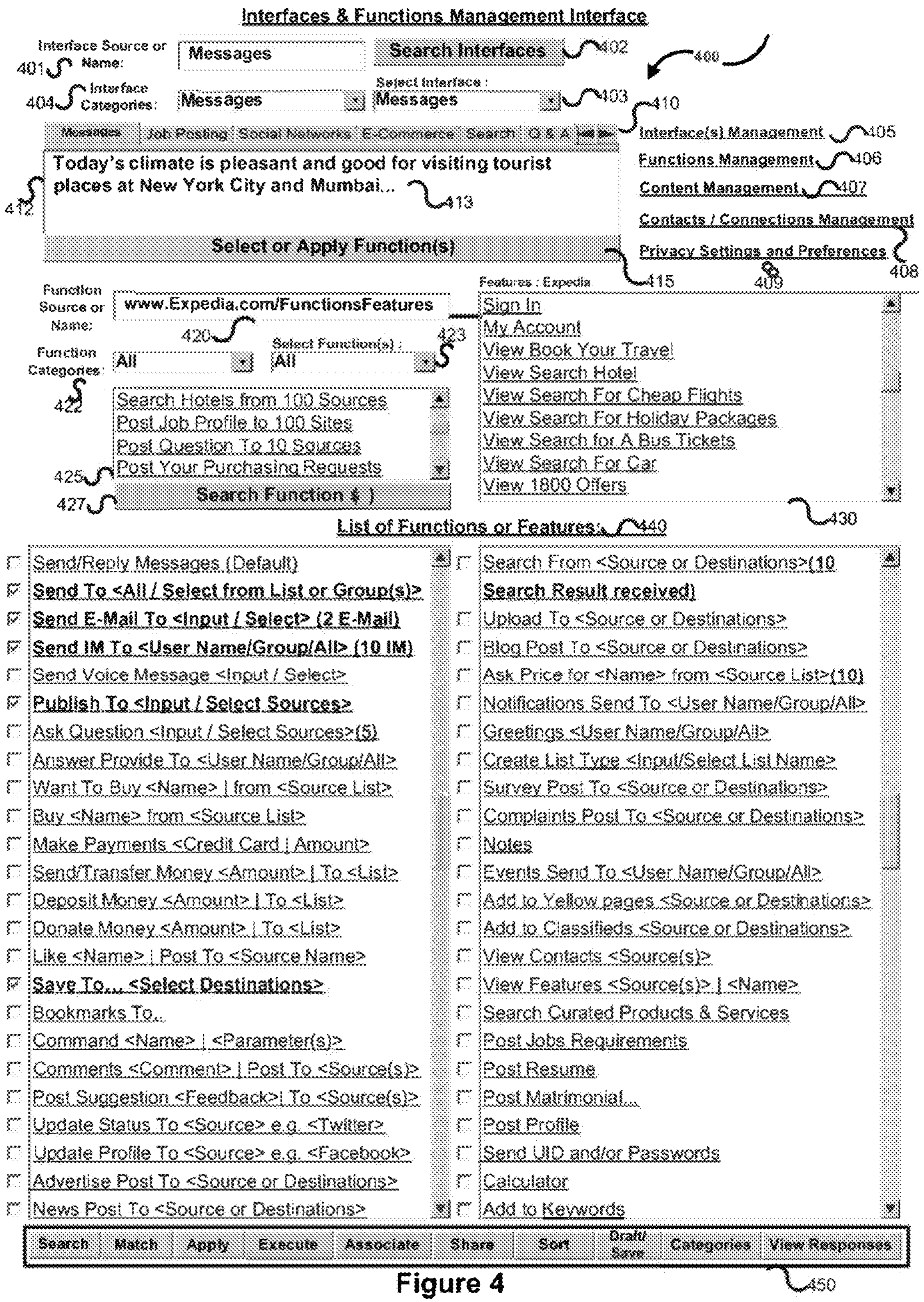

Figure 4

Interfaces & Functions Management Interface

Interface Source or Name: [Messages]   Search Interfaces ~402   400

404 ─ Interface Categories: [Messages]   Select Interface: [Messages] ~403   410

| Messages | Job Posting | Social Networks | E-Commerce | Search | Q & A |

Interface(s) Management ~405
Functions Management ~406
Content Management ~407
Contacts / Connections Management
Privacy Settings and Preferences
408

412 — Today's climate is pleasant and good for visiting tourist places at New York City and Mumbai... ~413

Select or Apply Function(s)

Function Source or Name: [www.Expedia.com/FunctionsFeatures]  420

Function Categories: [All]   Select Function(s): [All] ~423

422 —
Search Hotels from 100 Sources
Post Job Profile to 100 Sites
Post Question To 10 Sources
425 — Post Your Purchasing Requests 427 — Search Function(s)

Features : Expedia ~415   409
Sign In
My Account
View Book Your Travel
View Search Hotel
View Search For Cheap Flights
View Search For Holiday Packages
View Search for A Bus Tickets
View Search For Car
View 1800 Offers

430

List of Functions or Features: ~440

- ☐ Send/Reply Messages (Default)
- ☑ Send To <All / Select from List or Group(s)>
- ☑ Send E-Mail To <Input / Select> (2 E-Mail)
- ☑ Send IM To <User Name/Group/All> (10 IM)
- ☐ Send Voice Message <Input / Select>
- ☑ Publish To <Input / Select Sources>
- ☐ Ask Question <Input / Select Sources>(5)
- ☐ Answer Provide To <User Name/Group/All>
- ☐ Want To Buy <Name> | from <Source List>
- ☐ Buy <Name> from <Source List>
- ☐ Make Payments <Credit Card | Amount>
- ☐ Send/Transfer Money <Amount> | To <List>
- ☐ Deposit Money <Amount> | To <List>
- ☐ Donate Money <Amount> | To <List>
- ☐ Like <Name> | Post To <Source Name>
- ☑ Save To... <Select Destinations>
- ☐ Bookmarks To...
- ☐ Command <Name> | <Parameter(s)>
- ☐ Comments <Comment> | Post To <Source(s)>
- ☐ Post Suggestion <Feedback> To <Source(s)>
- ☐ Update Status To <Source> e.g. <Twitter>
- ☐ Update Profile To <Source> e.g. <Facebook>
- ☐ Advertise Post To <Source or Destinations>
- ☐ News Post To <Source or Destinations>

- ☐ Search From <Source or Destinations>(10 Search Result received)
- ☐ Upload To <Source or Destinations>
- ☐ Blog Post To <Source or Destinations>
- ☐ Ask Price for <Name> from <Source List>(10)
- ☐ Notifications Send To <User Name/Group/All>
- ☐ Greetings <User Name/Group/All>
- ☐ Create List Type <Input/Select List Name>
- ☐ Survey Post To <Source or Destinations>
- ☐ Complaints Post To <Source or Destinations>
- ☐ Notes
- ☐ Events Send To <User Name/Group/All>
- ☐ Add to Yellow pages <Source or Destinations>
- ☐ Add to Classifieds <Source or Destinations>
- ☐ View Contacts <Source(s)>
- ☐ View Features <Source(s)> | <Name>
- ☐ Search Curated Products & Services
- ☐ Post Jobs Requirements
- ☐ Post Resume
- ☐ Post Matrimonial...
- ☐ Post Profile
- ☐ Send UID and/or Passwords
- ☐ Calculator
- ☐ Add to Keywords

| Search | Match | Apply | Execute | Associate | Share | Sort | Draft/Save | Categories | View Responses |

Figure 4   ~450

List of Functions or Features: 610

| | |
|---|---|
| ☐ Ask Weather | ☐ Travel Planning <Specifications> \| <Info. \| Hotels \| Bookings> |
| ☐ Post to Matched Users.... | |
| ☐ Sent Instruction(s)... | ☐ Participate With <Discussion \| Comments\| Forum etc.> |
| ☐ Post Health Report | |
| ☐ Post to Forums.... | ☐ Change UID / Password |
| ☐ Post to Group(s)... | ☐ Save To Calendar |
| ☐ Post to Social Network.... | ☐ User Created Functions |
| ☐ Request Help | ☐ User Created Rules |
| ☐ Save as Card | ☐ Business Enquiry |
| ☐ Post to Wiki... | ☐ Post Business Enquiry |
| ☐ Request Music/Songs.... | ☐ Send Link |
| ☐ Translate To..... | ☐ Post Videos To.... |
| ☐ Request Support From.... | ☐ Post Images To.... |
| ☐ Save To Database.... | ☐ Post Album To.... |
| ☐ Download...From.... | ☐ Ask Stock Quote.... |
| ☐ Post Movie Review | ☐ Purchase Stock |
| ☐ Post Brand Usage Details... | ☐ Ask Sports Score.. |
| ☐ Railway Time Table Enquiry | ☐ Buy Movie Tickets.... |
| ☐ Book Railway Ticket | ☐ Publish to Web Page... |
| ☐ Buy Virtual Good <Source(s)> | ☐ Publish to Web Site.... |
| ☐ Bus Schedule <Specification> | ☐ Post Deals |
| ☐ Present My Public Contents on <All \| Select from categories List(s)> | ☐ Buy Deals |
| | ☐ Refer...To.... |
| ☐ Search <Images \| Videos> | ☐ Post Supply Requirement To <Ebay, Amazon, Alibaba>.... |
| ☐ Send Message To <Source(s)> (e.g. WhatsApp, MTV, Facebook Message etc.. | |
| | ☐ Call....<Phone No.> |
| ☐ Request Appointment(s) <Date\|Time> <Name> | ☐ Add To Personal Lifestream |
| | ☐ Search Hobby or Interest |
| ☐ Web site <Personal \| Name etc..> | ☐ 3rd Parties developers, web sites and service providers created functions |
| ☐ Create Publications.... | |
| ☐ Post Press Release | ☐ Functions access via 3rd parties API |
| ☐ Sent Invitations | ☐ Order <Food Item Name from list of 10000 Menu Item>\| From <Select from 110 Sources> |
| ☐ Map Request <Directions> | |
| ☐ How To Do <Task or activity or Process or Workflow Name or Keyword> | ☐ Order Gift <Flower\|Cakes\|Card etc.> |
| | ☐ Subscribe <Magazine (Source Name)>\|Milk <No. of Litter (Source Name)>\|TV Channels (Source Name)> |
| ☐ Looking For Real estates <Specification e.g. Location, ranges, features> | |
| ☐ Look For <Phone \| Address> | ☐ Sell Deals \| Products \| Services <List of Sources> |
| ☐ Subscribe.... | |
| ☐ Install Apps.... | ☐ Add to Contacts or Connections |
| ☐ Access Database(s) <Patent \| Brand \| Products \| Yellow Pages \| etc..> | ☐ Share Contents To <Source or Destinations> |
| | ☐ Play Games <Name \| Source> |

| Search | Match | Apply | Execute | Associate | Share | Sort | Draft/Save | Categories | View Responses |

Figure 5

INSTALLING WEB APPLICATION AS STANDALONE APPLICATION IN THE CLIENT DEVICE

RELATED APPLICATIONS

This application is a Continuation of U.S. application Ser. No. 18/100,163 filed on Jan. 23, 2023, which issues on Jan. 30, 2024 as U.S. Pat. No. 11,886,693, which is a Continuation of U.S. application Ser. No. 17/384,823 filed on Jul. 26, 2021, which issued on Jun. 20, 2023 as U.S. Pat. No. 11,681,425, which is a Continuation of U.S. application Ser. No. 15/008,483 filed on Jan. 28, 2016, which issued on Jun. 4, 2019 as U.S. Pat. No. 10,310,723, which is a Continuation of International Application No. PCT/IB2013/056314 filed on Aug. 1, 2013, and having inventors in common, which are incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

COPYRIGHT INFORMATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever. The applicant acknowledges the respective rights of various Intellectual property owners.

FIELD OF INVENTION

This application relates to the field of computers, and particularly, to web application publishing and installing in local storage of device method and system.

BACKGROUND OF THE INVENTION

Generally users are using various applications, services, web sites and devices for communicating and messaging with other users, sharing user generated contents, creating connections and social networks, conducting e-commerce. Users are enabled to input, select, attach, compose, and/or draft various types of content, so why is the user required to register various applications, services, web sites and devices for various types of needs. Present invention enables multiple functions on contents for communications, messaging, publishing, posting, requesting, executing commands, presenting, processing, e-commerce, transactions, workflow, activities, actions, searching, and sharing via single interface.

By using present invention user can input, select, attach, prepare, compose one or more types of contents including text, commands, audio, video, photos or images, files, applications, objects, workspaces, URLs or links and can select one or more functions for conducting one or more types of activities, actions, process, workflow, tasks, transactions, communications, messaging, publishing, presenting, posting and requesting contents, executing commands, processing, formatting, structuring and interpreting contents, conducting e-commerce transactions, searching, and sharing with one or more sources and/or destinations including one or more applications, services, social networks, users, web pages, web sites, domains, databases, networks and devices from single standard user-friendly and mobile or Smartphone friendly interface.

Some applications or devices provide one or more features e.g. send message, send contact and like which are limited and not provide list of plurality types of pre-created standard functions which are operable on selected or inputted or attached or composed contents and enable user to-do plurality of tasks including communications, messaging, publishing, posting, requesting contents, executing commands, presenting, processing, conduction e-commerce, transactions, workflow, activities, actions, searching, and sharing.

Some applications or devices provide command line for executing commands which are limited compared to provided full feature functions which comprise function specific user selections and present function specific interface(s), list(s), template(s), objects, multimedia data or contents, metadata, system data, user selection or input controls, applications and/or services.

At present, various web sites are enabled to integrate various buttons of various web sites or applications or providers with web page(s) and are able to provide various functions to users including Twitter, Facebook sharing, YouTube, Goggle and like. But users have to register or visit various web sites and use various integrated buttons and associate interfaces integrated by that web site and provided by others for various purposes. But in the present scenario users are not able to use a single interface for selecting, inputting, editing, drafting and composing contents and can access plurality types of functions provided or integrated by a Function Server and various sources, $3^{rd}$ parties' developers and providers.

Currently, users or applications can access various distributed objects via various web services and users can also access various features of the menu(s) of the application(s). But users are not enabled to access heterogeneous types of functions and interfaces provided by wide varieties of $3^{rd}$ parties' developers and services providers for wide variety of requirements from one parent interface or from one source in a unified, integrated, interwoven, collaborative, shared manner.

The present invention provides a wide variety of generalized, standardized, and unified interfaces and/or functions from plurality of sources, wherein each interface(s) can use one or more user selected functions or each function(s) can use one or more interface(s) and each function can connect with one or more servers, sources, applications, services, objects, distributed objects, web sites, web pages, networks, social networks, features, databases and devices for one or more types of tasks, activities, actions, events, transactions, interactions, communications, sharing, messaging, e-commerce transactions, requesting contents, downloading and/or uploading applications and/or services and/or one or more types of contents, subscribing, publishing, posting, executing commands, presenting, processing, workflow, searching and accessing.

At present users are using internet including plurality of non-standard web sites for various types of general activities including Use a search engine to find information, Send or read e-mail or messages, Look for info on a hobby or interest, Search for a map or driving directions, Check the weather, Look for information online about a service or product you are thinking of buying, Get news, Go online just for fun or to pass the time, Buy a product, Watch a video on a video-sharing site like YouTube or Vimeo, Visit a local, state or federal government website, Use a social networking site like Facebook, LinkedIn or Google Plus, Buy or make a reservation for travel, Do any banking online Look online for news or information about politics, Look online for info about a job, Look for "how-to," "do-it-yourself" or repair information, Look for information on Wikipedia, Use online classified ads or sites like Craigslist, Get news or information about sports, Take a virtual tour of a location online, Search for info about someone you know or might meet, Send instant messages, Upload photos to a website so you can share them with others online, Pay to access or download digital content online, Look for info about a place to live, Download music files to your computer, Get financial info online, such as stock quotes or mortgage interest rates, Rate a product, service or person using an online rating system, Play online games, Categorize or tag online content like a photo, news story or blog post, Read someone else's online journal or blog, Look for religious/spiritual info, Post a comment or review online about a product you bought or a service you received, Post comments to an online news group, website, blog or photo site, Share something online that you created yourself Make a phone call online, using a service such as Skype or Vonage, Research your family's history or genealogy online, Participate in an online auction, Make a donation to a charity online, Download a podcast so you can listen to it or view it later, View live images online of a remote location or person, using a webcam, Use Twitter and/or Facebook, Download or share files using peer-to-peer file-sharing networks, such as BitTorrent or LimeWire, Sell something online, Create or work on your own webpage, Create or work on your own online journal or blog, Buy or sell stocks, bonds, or mutual funds, Use an online dating website, Visit virtual worlds such as Second Life. A majority of these activities are divided into general types of activities and it is possible to develop and present generalized, unified, common, structured and standardized user interfaces and functions to users, so users are enabled to conduct various types of activities from one place and do not have to register, access and maintain account and user data including profile, payment information, connections and like at various web sites, applications, and services to conduct these activities. In another embodiment users can dynamically select, order, or orchestrate one or more function that are dynamically presented or auto matched or determined by other users or provided or presented by $3^{rd}$ parties' developers and providers.

Presently users have to register with different web sites for different purposes including search engines, e-commerce web sites, social networking web sites, messaging and communication web sites and applications. Conventionally, a user can search, register with web sites, subscribe to services, install applications, share content, and make payments by using a plurality of sources for different varieties of users' requirements and activities. Typically these sources are disparate and disorganized. In other words, the user must spend time researching, searching, registering, accessing, and identifying different sources that are not present in consolidated, coherent, unified and integrated manner. Often many of the sources are not relevant to user. What is needed is enabling user(s) to conduct plurality types of tasks, activities, actions, events, interactions, workflow, communications, messaging, sharing, social networking, searching, matching, questioning, commanding, requesting, publishing, advertising, posting comments and reviews, transactions from one place or via single standard user friendly interface in unified and integrated manner for solving users on demand wide varieties of requirements.

Therefore, itis with respect to these considerations and others that the present invention has been made.

No prior art provides on demand, customized, contextual, dynamic, unified and integrated environment for communication, collaboration, transaction, participation, sharing, and/or providing a response. Users do not have to install a plurality of applications, subscribe to a plurality of services, register with different applications, web sites and services, and maintain different profiles for different web sites and apps, searching content and media data from plurality of different sources. By using present invention user can access plurality of applications, services, communication channels, activities specific dynamic actions, objects, connected or connectable nodes of network without departing from present network and user can share user data, application data, and profile with plurality of apps, services and users based on privacy settings.

OBJECT OF THE INVENTION

The principal object of the present invention is to enabling user to-do various human mediated actions including select, input, attach, compose one or more types of contents including text, commands, audio, video, photos or images, files, applications, objects, workspaces, URLs or links via single dynamic and intelligent interface and enable to select one or more functions for conducting various types of activities, actions, process, workflow, tasks, transactions, communications, messaging, publishing, presenting, posting and requesting contents, executing commands, processing, formatting, structuring and interpreting contents, conducting e-commerce transactions, searching, and sharing with one or more sources and/or destinations including one or more applications, services, social networks, users, web pages, web sites, domains, databases, networks and devices from single standard user-friendly and mobile or Smartphone friendly interface.

Another significant objective of the present invention is to enable $3^{rd}$ parties developers and providers to develop, create, register, verify, maintain, store, upload, update, upgrades, process, manage, provide interfaces and/or functions and/or function links and associate referred applications, services, objects, controls, multimedia data, user actions, interface, networks, groups, databases, attachments, lists, connections, privacy settings, preferences, metadata, connectable nodes of the network(s) and verify, validate, register, store to Interfaces and Function Server(s) or central server unit for making them searchable for network users and enable users to search, match, select, purchase, download, subscribe, register, attach, associate, update, upgrades, rank and access on or more interfaces and/or functions and/or functions links.

Another significant objective of the present invention is to enable users to define, create, compose, develop, generate, order, orchestrate, or compose based on rules related to one or more functions. Users are enabled to apply privacy settings to one or more functions for allowing selected users including connected or related or matched or suggested or subscribers or users of network(s) to access said one or more functions. Interfaces and Functions Server(s) or central server unit dynamically updates and presents said each interface and/or function and/or function link of each user to selected, connected, related users of user based on said privacy settings of sender or source and/or receiving users, wherein accessing of said dynamically presented interface and/or function and/or function link enables dynamic, customize, contextual, unified, in-single interface, collaborative, integrated, trusted, verified, secure, on demand and accessible social networks, groups, workflow, workspace, communication, collaboration, making new connections, e-commerce, viral marketing, advertisements, interactions, transactions, user actions, sharing, and participation of activities between or among user, connected users of users, providers and dynamic and accessible function link(s). Interfaces and Functions Server(s) or central server unit and providers stores information about interactions between or among user, connected users of users, providers, various types of interfaces and functions.

Another significant objective of the present invention is to provide platform or application network or framework to developers, service providers, sponsors, advertisers and content or multimedia data providers to develop, register, verify, upload, test, making them searchable and available, provide updates, upgrades, support, integrate advertisement or e-commerce, share revenue and/or sell one or more interfaces and/or functions and associate or referred applications, objects, process, services and content or multimedia data.

Another significant objective of the present invention is to providing platform for presenting and accessing plurality types of generalized interface(s) and functions from plurality of sources for enabling communications, messaging, publishing, posting, requesting, executing commands, presenting, processing, e-commerce, transactions, workflow, activities, actions, searching, and sharing from single user interface.

Another significant objective of the present invention is to provide a combined multi-tier or n-tier Internet or Network Architecture and unified generalized presentation and functions oriented internet.

Another significant objective of the present invention is to provide internet middleware for enabling user to access plurality features of plurality of web sites, applications, services, databases, networks, social networks and peer to peer networks from a single user friendly interface.

Another significant objective of the present invention is to providing domain or subject or feature or task specific general and/or dynamic form(s) or interface(s) for enabling user to select, input and compose various types of pre-created or dynamically generated or user created or customized form(s) or form(s) field(s), contents and items including job(s) requirement posting, profile posting, question posting, message posting, purchase requirement posting general and/or dynamic form(s) or interface(s) and enable to select one or more functions for each form(s) or interface(s) for conducting various types of actions, execution, activities, transactions, tasks, jobs, workflows, including post job requirement to 100 top or curated or selected site, post purchase requirement to 1000 of sites, servers, applications, services, databases, devices and sources. Server formats, process, transform, verify, validate, test user requests including user selections and/or contents for each type of functions and/or interface and/or sources to make it compatible for each function and/or source.

Another significant objective of the present invention is to presenting to user various selected features, functions, web parts, user actions of one or more web sites at central interface.

Another significant objective of the present invention is to present various collaborative, unified, combined, standardized, customizable, dynamic, run time customizable, and generalized interface(s) and/or features, functions, web parts, user actions of web sites, applications, services from one or more sources at central interface.

Another significant objective of the present invention is to enabling users or developers or service providers and/or 3rd parties web sites, applications, networks, services, social networks, search engines, e-commerce web sites, databases, devices, peer to peer networks to easily, directly, single source accessibility, dynamically, quickly integrating, registering, participating, providing applications and services, collaborating, communicating, searching, sharing, publishing, messaging, accessing, using, conducting of facilitating various types of activities, actions, interactions, participations, workflow, events, transactions at/of/with/by/to/in/on one or more web sites, applications, networks, services, social networks, peer to peer networks and connected or related or network(s) users of web sites, portals, applications, services, networks, groups, social networks and devices.

Another significant objective of the present invention is to increase user base, user engagement, user activities, actions, transactions, communications and interactions and user participations with the internet, web sites, applications, services, databases, networks, social networks and devices.

Detail Description of the Preferred Embodiment

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" requests, responses, communications, interfaces, and functions from a device or component includes receiving the requests, responses, communications, interfaces, and functions indirectly, such as when forwarded by one or more other devices or components. Similarly, "sending" an item, requests, responses, communications, interfaces and functions to a device or component includes sending the items, requests, responses, communications, interfaces, and functions indirectly, such as when forwarded by one or more other devices or components.

As used herein, the term “client application” refers to an application that runs on a client computing device. A client application may be written in one or more of a variety of languages, such as ‘C’, ‘C++’, ‘C#’, ‘J2ME’, Java, ASP.Net, VB.Net and the like. Browsers, email clients, text messaging clients, calendars, and games are examples of client applications. A mobile client application refers to a client application that runs on a mobile device.

As used herein, the term “network application” refers to a computer-based application that communicates, directly or indirectly, with at least one other component across a network. Web sites, email servers, messaging servers, and game servers are examples of network applications.

Briefly stated, the present invention is directed towards new type of internet including enabling users to access all generalized features collaboratively from single user-friendly interface. User(s) is/are enabled to search, match, purchase, install, attach, subscribe, update, upgrade, select, switch, access, use one or more generalized, multi-purpose, multi sources enabled, customizable, personalize, dynamic, unified, domain or subject or task or workflow or category or type specific interfaces from plurality of sources including 3rd parties developers, providers, users of networks, sponsors, and advertisers. User(s) is/are also enabled to search, match, purchase, install, attach, subscribe, update, upgrade, select, switch, access, use one or more pre-created or user created or customized or orchestrated plurality types of domain or subject or task or workflow or category specific multi-purpose, multi-source enabled, multi task specific functions. Users can access multiple features of multiple web sites from single user interface. Users can communicate, share, post messages, sent search requests, conduct plurality types of banking or monetary or e-commerce transactions, conduct plurality types of activates, actions, events, functions, tasks, workflow with plurality types of web sites, applications, services, networks, devices, databases, sources from one single source or single place or central user interface.

Mechanisms of the invention may enable user to access all generalized subject or domain or task specific features of the internet including features, forms, database, profile, applications, objects of 3rd parties websites, applications, services, networks from single standard user interface. Users are enabled to select interface(s) and/or functions provided by various sources for conducting a wide variety of user activities including online activities, various types of e-mail, instant messaging, e-commerce, entertainment, booking, searching, sharing, viewing, commenting, reviewing, rating, participating, writing and posting blogs, communicating, downloading, uploading, and transacting.

In computer programming, a subroutine is a sequence of program instructions that perform a specific task, packaged as a unit. This unit can then be used in programs wherever that particular task should be performed. Subprograms may be defined within programs, or separately in libraries that can be used by multiple programs.

In different programming languages a subroutine may be called a procedure, a function, a routine, a method, or a subprogram. The generic term callable unit is sometimes used.

As the name subprogram suggests, a subroutine behaves in much the same way as a computer program that is used as one step in a larger program or another subprogram. A subroutine is often coded so that it can be started (called) several times and/or from several places during one execution of the program, including from other subroutines, and then branch back (return) to the next instruction after the call once the subroutine’s task is done.

Subroutines are a powerful programming tool, and the syntax of many programming languages includes support for writing and using them. Judicious use of subroutines (for example, through the structured programming approach) will often substantially reduce the cost of developing and maintaining a large program, while increasing its quality and reliability. Subroutines, often collected into libraries, are an important mechanism for sharing and trading software. The discipline of object-oriented programming is based on objects and methods (which are subroutines attached to these objects or object classes).

The content of a subroutine is its body, the piece of program code that is executed when the subroutine is called or invoked.

A subroutine may be written so that it expects to obtain one or more data values from the calling program (its parameters or formal parameters). The calling program provides actual values for these parameters, called arguments. Different programming languages may use different conventions for passing arguments.

The advantages of breaking a program into subroutines include: decomposing a complex programming task into simpler steps: this is one of the two main tools of structured programming, along with data structures, reducing duplicate code within a program, enabling reuse of code across multiple programs, dividing a large programming task among various programmers, or various stages of a project, hiding implementation details from users of the subroutine, improving traceability, i.e. most languages offer ways to obtain the call trace which includes the names of the involved subroutines and perhaps even more information such as file names and line numbers; by not decomposing the code into subroutines, debugging would be impaired severely.

In one embodiment present invention presenting one or more types of unified or dynamic or generated or customized or standard user interfaces, wherein said interfaces provided, presented and integrate by/from one or more sources, providers, connected or related users of user developers, servers, web sites, databases, applications, services, networks and devices; enabling user to use or access or interact or select from one or more types of controls of one or more types of interfaces and/or search, match, select, input, capture, record, import, attach, edit, format, and/or compose one or more types of contents; and enabling user to select one or more functions or types or categories or links of functions or requests or features or actions or activities or transactions or events or objects or modules or process or workflow, wherein said functions integrate and/or provided and/or host and/or execute by/from/on one or more sources, providers, developers, servers, web sites, databases, applications, services, networks and devices.

In another embodiment interface(s) comprising editor, one or more types of controls or user interface components and presentation logic components including textbox, search box, checkbox, radio button, list box, combo box, menu, wizard, grid, button(s), form(s) and one or more types of controls, objects, plug-ins, applications, application code or script, dynamic presentation interface.

In another embodiment interface(s) type of interface or unified interface comprising send message interface, search interface, share interface, e-commerce or buy interface, registering domain name interface and plurality types of subject or domain or application or task or service or workflow specific interfaces.

In another embodiment interface(s) presenting type(s) of interface(s) are based on user selection.

In another embodiment interface(s) dynamically presenting type(s) of interface(s) are based on user selections of function(s), preferences, privacy settings, determined by other users, auto matchmaking based on user data, profile, user actions, activities, events, transactions, interactions.

In another embodiment interface(s) enable the user to customize the interface.

In another embodiment interface(s) contents comprising text, commands, audio, video, photos or images, files, applications, objects, voice messages, profile, icons, node(s) of network(s), workspaces, URLs or links, database record, structures, syntax, script, templates, list, category, keyword and selected items.

In another embodiment interface(s) enable user to search, match, sent request, select, register, host, store, process, associate metadata, privacy policies, terms and agreements of access, use, present or make available and support, documents, license, helps, advertisements, user data and system data, purchase, download, upload, install, subscribe, view associate accounts, analytics and hit statistics, configure, trial, run-time customize, customize, attach, associate, share, access, rank, provide comments, complaints, feedbacks and reviews, apply privacy settings and preferences, refer, sort, filter, detach, un-registered, un-install, categories, order one or more types of one or more interfaces and/or functions from/to one or more sources, destinations, web sites, applications, services, networks, databases, servers and devices.

In another embodiment interface(s) wherein functions including Send Messages, Send Contents To one or more groups, subscribers or followers, select one or more or categories or group of connected or related or network users of one or more networks, lists, web sites, web pages, applications, services, objects, social networks, databases, servers and devices, Send E-Mail To one or more users or subscribers or groups of one or more sources and destinations, Send Instant Messages or Voice Messages To one or more groups, users, subscribers of one or more instant messaging service providers, networks, devices, applications and services, Publish one or more types of contents To one or more web sites, web pages, domains, applications, services, databases, devices and social networks, Ask Price for particular products and services, Want To particular products and services, Ask Question for receiving answers from one or more sources, web sites, applications, services, social networks, devices, databases and networks, Buy one or more products and services from particular source(s), Make one or more types of Payments including Credit Card payments and Bills Amount, Send/Transfer Money To one or more users of network(s), account holders of bank(s), service providers, vendors, and merchants, Deposit Money To one or more accounts of banks, financial institutions and service providers, Donate Money To one or more users of networks, institutes, governments and other agencies, Like one or more branded products and services and share or post to one or more web sites and social networks, Save contents To one or more or selected destinations including databases, storage medium of one or more web sites, servers, devices and networks, Bookmarks one or more types of resources and save To one or more destinations, use plurality types of Commands and associate parameter(s) provided by plurality of sources including 3rd parties developers, web sites and service providers for conducting plurality types of activities, actions, access, process, interactions, workflow, tasks, events and transactions, post or access or view one or more types of Comments, shared contents, blogs, articles, answers of questions, notifications, advertisements, news, suggestions, feedbacks, complaints, notes, events, updated status, updated profile(s) at/from/to one or more selected web sites, web pages, users of network(s), profiles, databases, networks, devices, applications and services, Search wide verities of contents, databases for one or more keywords, advance search criteria from plurality of sources, web sites, search engines, databases, devices, networks, social networks, Upload one or more types of shared contents To one or more destinations, web sites, web pages, applications, services, social networks, devices, databases and networks, purchase and/or send preferred or selected virtual goods or greeting cards from one or more providers and e-commerce web sites, Create one or more types of List and add one or more items to one or more web sites, applications and services, select one or more types of Survey Forms from one or more sources, web sites, applications, databases, networks, devices and services and Post To one or more sources, web sites, applications, databases, networks, devices and services, search, select, add one or more types of items or entries to one or more types of Yellow pages at one or more sources, web sites, applications, databases, networks, devices and services, search, invite, connect and view Contacts and/or connected users of user from one or more sources, web sites, applications, databases, networks, devices and services, access, use, view, browse one or more types or categories or subject or domain or similar types of Feature(s) from one or more sources, web sites, applications, databases, networks, devices and services, Search Curated Products and Services, Post Jobs Requirements, Resume, Dating or Matrimonial Profile, and User Profile at one or more sources, web sites, applications, databases, networks, devices and services, Send, access, and update one or more UID and/or Passwords from/to one or more web sites, applications, databases, networks, devices and services, ask Meaning, use various functions or calculators, Ask Weather, Sent Instruction(s), Post Health Report, Post to Forums, Post to Group(s), Post to Social Network(s), Request Help, Save as Card, Post to Wiki, Request Music/Songs, Translate contents from one language(s) To other language(s), Request Support From(s), Save To Database(s), Download one or more types of contents, Post Movie Review.

Post Brand Usage Details, Request Railway Time Table Enquiry, Book Railway Ticket(s), Buy Virtual Goods, Request Bus Schedules, Present User's Public Contents, Search Images or Videos, Send Message To WhatsApp, MTV, Facebook Message etc., Request Appointment(s), access Web sites or web pages or part of web site(s), Create Publications, Post Press Releases, Sent Invitations, Requesting Maps and Directions, Ask How To Do particular Task or activity or Process or Workflow, Looking For Real Estates as per particular Specifications e.g. Location, ranges, features etc., Look For Phone number and Address, Subscribe particular services, Install one or more selected or particular applications, Access Database(s) including Patents, Brands, Products, Yellow Pages etc., Play Games, Request information for Travel Planning as per Specifications and book Hotels, Tickets etc., Participate With particular users, web sites, activities, applications, discussions, forum etc., Save tasks, notes, appointments etc. To one or more types of Calendars at one or more web sites, applications, profiles, and devices, Request and post Business Enquiry, Send Links, Post Videos, Images, Albums To one or more sources, Ask Stock Quotes, Purchase Stocks, Ask Sports Score, Buy Movie Tickets, Publish Web Pages and Web Sites, Post and Buy Deals, Refer particular products and service To one or more users, Post Supply Requirement To one or more web sites including eBay, Amazon, Alibaba etc., Call particular Phone or Mobile No., Add notes or contents or activities details To Personal Life stream, Search Hobby or Interest, Order particular Food Item Names selected from list(s) from one or more sources, Order Gift Items including Flower, Cakes, Card etc., Subscribe one or more items including Magazines, Newspapers, TV Channels. The user is also enabled to create, define, orchestrate user Created Functions based on one or more rules. 3rd Parties developers, web sites and service providers can develop, create, define, post, host, register, upload, make available plurality types of functions. Functions can access via 3rd parties APIs, web sites, servers, web services and networks.

In another embodiment functions are presented from one or more sources.

In another embodiment source(s) comprising one or more applications, services, database, servers, devices, networks, web pages, web sites, 3rd parties developers' server(s).

In another embodiment providing hit statistics, detail analytics, total number and amount of transactions on each function.

In another embodiment enable to share revenues including advertising, subscription and e-commerce revenues with function(s) providers and/or developers.

In another embodiment enable to presenting functions by server(s), devices, users of network(s), connected, related, matched, determined and allowed users, 3rd parties developers, advertisers, sponsors, service providers and experts.

In another embodiment presenting functions based on user selection of interface(s), user's and connected users' profile(s), user(s) associate data, user selections, privacy settings and preferences.

In another embodiment formatting, verifying, validating and structuring contents based on selection of one or more functions or type(s) of functions.

In another embodiment presenting function(s) associate one or more interfaces, list(s), template(s), objects, multimedia data or contents, metadata, system data, user selection or input controls, applications and/or services.

In another embodiment enable users to select one or more functions before searching, matching, selecting, inputting, importing, attaching, editing, formatting, and/or composing one or more types of contents.

In another embodiment enable users to present functions and/or interface(s) based on one or more searched, matched, identified, determined, selected, and inputted sources and/or URLs or names of source(s).

In another embodiment presenting one or more selected function(s) specific one or more interface(s) for further user interaction, actions, selections, and user inputs.

In another important embodiment present invention enables user to select one or more functions or types or categories or links of functions or requests or features or actions or activities or transactions or events or objects or modules or process or workflow, wherein said functions integrate and/or provided and/or host and/or execute by/from/on one or more sources, providers, developers, servers, web sites, databases, applications, services, networks and devices; present selected function specific one or more types of unified or dynamic or generated or customized or standard user interfaces, wherein said interfaces provided, presented and integrate by/from one or more sources, providers, connected or related users of user developers, servers, web sites, databases, applications, services, networks and devices; and enable user to use or access or interact or select from one or more types of controls of one or more types of interfaces and/or search, match, select, input, capture, record, import, attach, edit, format, and/or compose one or more types of contents.

In another embodiment presenting selected function specific content management interface and associate features.

In another embodiment enabling interface(s) and/or associated or attached or used functions to share, synchronize, map, process, convert, format and use user data and system data as per user mediation and associated or applied privacy settings and preferences.

In another embodiment one or more interface(s) are pre-integrated with one or more functions.

In another embodiment one or more interface(s) and/or functions can share data with another one or more interface(s) and/or functions based on applied privacy settings and preferences.

In another embodiment enable users to automatically and/or manually identify interfaces for storing, processing and presenting received responses from one or more sources.

In another embodiment enable 3rd parties sources to send responses compatible to interfaces and functions management interface.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 4 illustrates exemplary graphical user interface (GUI) for managing and accessing various types of functions and/or interfaces from various sources;

FIG. 5 illustrates exemplary graphical user interface (GUI) for part of functions list of FIG. 4-440 for accessing various types of functions available from various sources.

DETAILED DESCRIPTION OF THE DRAWINGS

Illustrative Operating Environment

Figure 1:
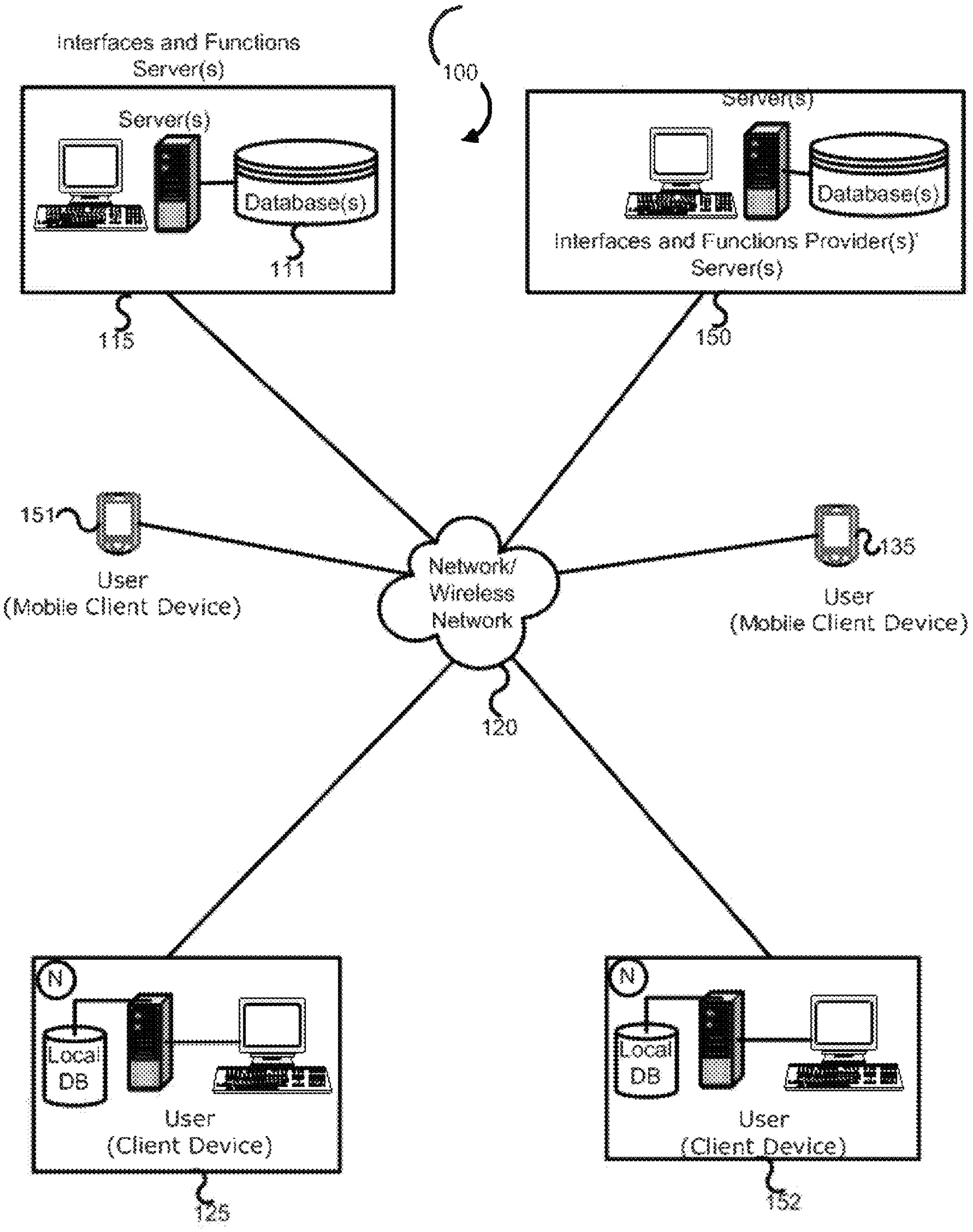
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes a client device, in particular mobile device 151 and 135 and personal computer 125 and 152. The system also includes network or wireless network 120, central server 115, Interfaces and Functions Provider(s)' Server(s) 150, and client devices 151 and 152 and 125 and 135.

A variety of client devices may be employed in accordance with the invention. The client devices may include mobile devices, digital home clients such as personal computers and media centers, and other client devices. Generally, mobile device 135 may include virtually any portable computing device capable of receiving and sending a message over a network, such as network 130, or the like. Mobile device 135 may also be described generally as a client device that is configured to be portable. Mobile device 135 may have the capability of connecting to a network using wireless technology, wired technology, or a combination of both wired and wireless technologies. Thus, mobile device 135 may include virtually any portable computing device capable of connecting to another computing device and receiving information. Such devices include portable devices such as cellular telephones, smart phones, display pagers, radio frequency (RF) devices, infrared (IR) devices, Personal Digital Assistants (PDAs), handheld computers, sensors, laptop computers, wearable computers, tablet computers, integrated devices combining one or more of the preceding devices, and the like. As such, mobile device 135 typically ranges widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile device 135 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, mobile device 135 may uniquely identify itself through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to central server 115 or other computing devices.

Mobile device 135 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as central server 115, another web server, or the like. However, the present invention is not limited to these message protocols, and virtually any other message protocol may be employed.

Mobile device 135 may be further configured to enable a user to participate in communications sessions, such as IM sessions. As such, mobile device 135 may include a client application that is configured to manage various actions on behalf of the client device. For example, the client application may enable a user to interact with the browser application, email application, IM applications, SMS application, and the like. Generally, instant messaging provides the ability for at least two computing devices to exchange messages in real time.

Mobile device 135 may further be configured to include a client application that enables the end-user to log into an end-user account that may be managed by a network application. Such an end-user account, for example, may be configured to enable the end-user to receive emails, send/receive IM messages, SMS messages, and access selected web pages, maintain a digital wallet, or the like.

Network 120 is configured to couple mobile device 135, 151 and Personal Computer 125 and 152, as well as other client devices not illustrated, and their components, with other network devices, such as central server 115, and the like. Network 120 is configured to couple responder client devices including mobile phone 135, 151 and Personal Computer 125 and 152 with central server 115.

Though for illustrative purposes network and wireless network are shown combined, in various environments employing the present invention, network and wireless network 120 may be the separate or same network, different networks, or different networks including a combination of overlapping components and distinct components. The discussion herein that describes network 130 may therefore be applicable to describe network 120.

Network 120 may include any of a variety of wired or wireless sub-networks that may further overlay stand-alone ad-hoc networks, and the like, to provide an infrastructure-oriented connection for mobile device 135. Such sub-networks may include mesh networks, Wireless LAN (WLAN) networks, cellular networks, and the like. Additionally, network 120 may connect to mobile devices with a wired connection, such as cable, phone lines, Ethernet wires, and the like. Network 120 may include wide area networks, such as the Internet. The invention may be used either generally with networks, specifically with wireless networks, or with various combinations of wireless and wired networks.

Network 120 may further include an autonomous system of terminals, gateways, routers, and the like connected by wireless radio links, and the like. These connectors may be configured to move freely and randomly and organize themselves arbitrarily, such that the topology of network 120 may change rapidly.

Network 120 may further employ a plurality of access technologies including 2nd (2G), 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as mobile device 135 with various degrees of mobility. For example, network 120 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 120 may include virtually any communication mechanism by which information may travel between mobile device 135 and another computing device, network, and the like.

Network 120 may further include or employ one or more network gateways (not shown) that serve as intermediaries between mobile device 135 and other network devices, such as central server 115. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ different protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway.

In one embodiment, network 120 may include one or more components of a Interfaces and Functions Management Interface and service that operates to facilitate or enable search, match, select, register, upload, host, store, process, download, install, subscribe, attach, update, upgrade, share, present and access interfaces and functions from plurality of providers 150 to client devices including mobile devices 135, 151 and smart device 125 and 152 and central server 115.

FIG. 1 shows mobile device 135 communicating with central server 115, and central server 115 communicating with Interfaces and Functions Providers Server(s) 150. FIG. 1 also shows central server 115 communicating with client devices 135, 151, 125 and 152. Each of these communications may employ a direct connection, or one or more networks, or a combination thereof. For illustrative purposes, FIG. 1 shows communication between central server 115 and Interfaces and Functions Providers Server(s) 150 employing network 120, however environments that include this communication may be employed with the present invention. In particular, central server 115 and Interfaces and Functions Providers Server(s) 150 may employ any one or more of direct communication, a local area network, or a wide area network, such as network 120.

A network enabling any one or more of the above communications may employ any form of computer readable media for communicating information from one electronic device to another. Also, the network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between central server 115, Interfaces and Functions Providers Server(s), and Developers, Sponsors, Advertisers and Providers 150, client devices 151, 152, 125 and 135, and other computing devices (not shown).

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pairs, coaxial cable, fiber optics, wave guides, and other wired media and wireless media such as acoustic, RF, infrared, and other wireless media.

Client devices 151, 135, 125 and 152 are computing devices that may be employed by a user, referred to as a receiver and sender, for receiving and sending or sharing interfaces and functions and/or function(s) links and associate data and user instructions. A variety of sender and/or receiver client devices may be employed in accordance with the invention. Client devices may include mobile devices, digital home clients such as personal computers and media centers, and other client devices. Generally, clients may include virtually any computing device, portable or non-portable, capable of receiving and sending a message over a network, such as network 120, or the like. Clients may include devices such as mobile device 151 (135) described herein. Though FIG. 1 illustrates only four Clients 151, 135, 125 and 152, it is envisioned that the invention may be practiced in an environment that includes a large community of sender and receiver clients. Thus, sender and receiver clients or members of network or Interfaces and Functions provider or user or receiver may number in the hundreds, thousands, hundreds of thousands, millions, or virtually any number.

Though FIG. 1 illustrates an embodiment of a system having each of network central server(s) 115 and Interfaces and Functions Providers Server(s) 150 as separate computing devices, the invention is not so limited. Software, hardware, or hardware-software combinations implementing any portion of these components may be combined with any other component on a single computing device, or arranged in a different manner among multiple computing devices. Some portion or all of the functionality of any component may be distributed or duplicated among multiple computing devices.

One embodiment of a network device that may be used to implement any one or more of central server 115 or Interfaces and Functions Providers Server(s) 150 is described in more detail below in conjunction with FIG. 3. Briefly, however, such network devices may include any computing device capable of communicating with other network devices to enable network applications or web sites to process, send and respond to requests from client devices, such as mobile device 135 is described in more detail below in conjunction with FIG. 2. Devices that may operate as these network devices include personal computers desktop computers, multiprocessor systems, microprocessor-based or programmable consumer electronics, network PCs, servers, and the like, or any combination thereof.

FIG. 1 illustrates an embodiment of a system having an ads server (not shown). Briefly, an advertisements server provides advertisements, such as banner advertisings, application advertisements or other types of advertisements. An application advertisement is an advertisement that is associated with an interaction with an application. It is typically integrated with the application presentation in some way. A search advertisement is an example of application advertisements. When a search is performed, a search application may select one or more ads based on the keywords of the search. The search application may combine search ads with the search results, and present them in an integrated manner. In some embodiments, the integration may be so complete that there is not a clear distinction between the search ads and the search results. In some embodiments, one or more ways of indicating the search ads may be included, such as text, color, line separators, and the like. Similarly, other applications may generate application ads. A mapping application, for example, may use the location specification in a request to generate advertisements based on the location, such as those of businesses in the area, and may display an advertisement on the map.

A banner advertisement typically is placed in a location that is separate from, or more distinguishable from, an application's results. For example, it may be at the top or bottom of a page, or along the margin. A banner advertisement may be selected based on criteria similar to those for an application ad, based on different criteria, or randomly selected.

Ads server (not shown) may have an associated ads database, which may be integrated or in communication with central server 150. An ads database may store data pertaining to advertisement contents, constraints, and rules pertaining to the use of each advertisement. At least a portion of the data stored in ads server may be specified by an advertiser. An advertiser may specify data describing the advertisement contents, constraints, and rules pertaining to the use of each advertisement.

Ads server may receive data or a set of parameters to use for determining whether to provide an advertisement, selecting and generating an advertisement, including data upon which various determinations are made. Selecting and generating an advertisement may include selecting an advertiser, selecting an advertisement associated with the advertiser, or selecting content to include in an advertisement. The data upon which these and other determinations may be based may include information derived from user data, user profile, information related to interactions among users and interfaces and function links and associate references nodes or objects received by the central server, and the like. The data upon which these and other determinations may be based may also include information about the user or mobile device, actions that the user or mobile device have taken, data pertaining to one or more advertisers, relevant events, and a variety of other types of information.

FIG. 1 illustrates an embodiment in which mobile device 135 communicates with central server 115. A user of mobile device 135, referred to as a provider and/or receiver of interfaces and/or functions and/or links of interfaces and/or links of functions based on privacy settings of provider and/or receiver, may employ mobile device 135 to send and/or receive interfaces and/or functions and/or links of interfaces and/or links to central server 115. Central server 115 may receive and process the interfaces and/or functions and/or links of interfaces and/or links from mobile device 135. Central server 115 may select a set of connected or related users of user devices 151 and 152. Central server 115 may employ identifiers or addresses of senders and receivers devices, or both. It may, for example, employ a login name or email address of a sender and/or receiver. It may employ an IP address, MIN, or other identifier of a device. Central server 115 may employ any one or more of these identifiers or addressing mechanisms when communicating with a sender and/or receiver device. As used herein, unless the context clearly indicates otherwise, the term "sender" and "receiver" may be used to refer to a person, a device, or a combination of a person and a device.

Illustrative Client Device

Figure 2:
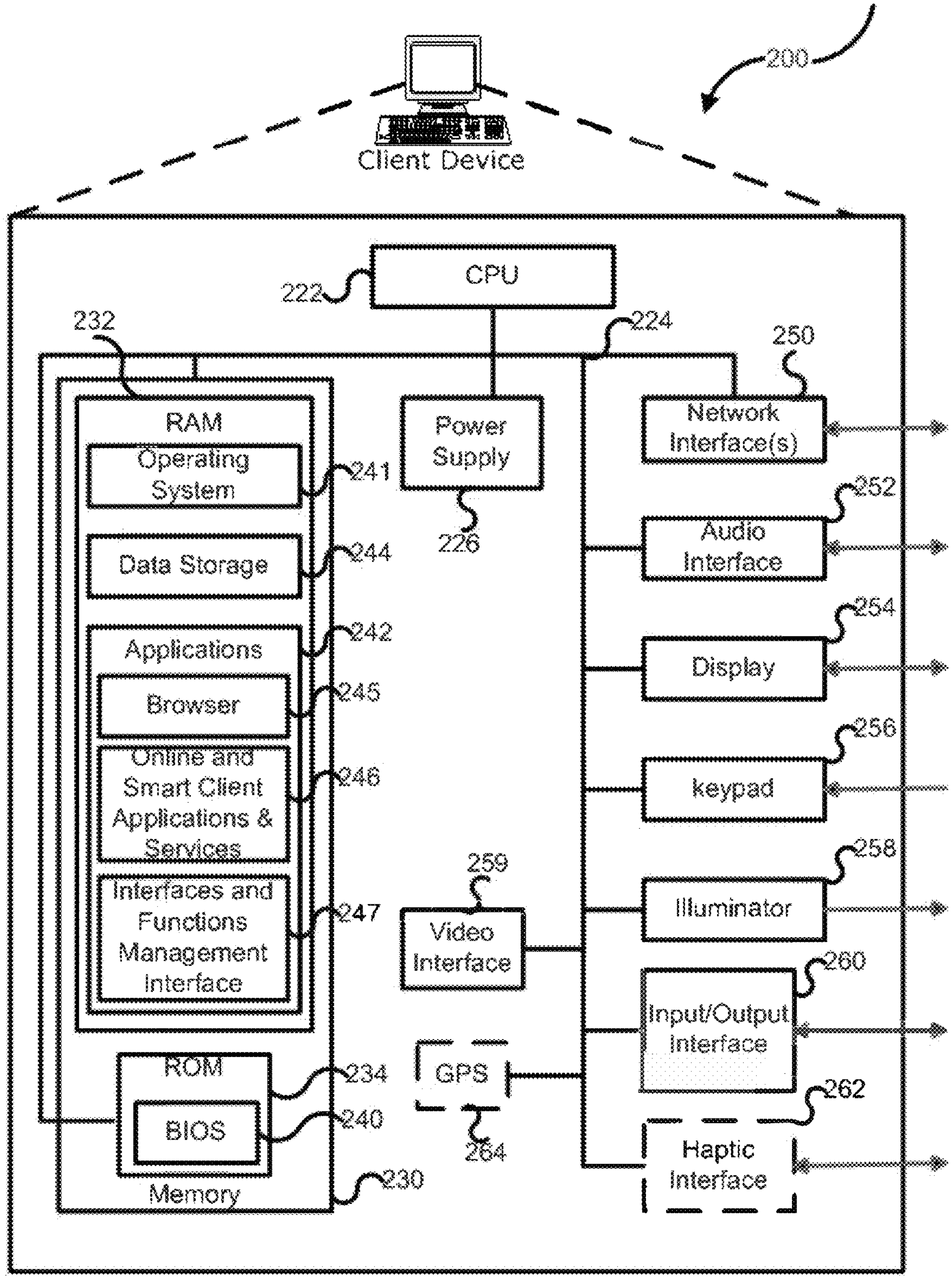
FIG. 2 shows one embodiment of a client device that may be employed in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, user client devices 151, 152, 125 and 135 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra-wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Optional haptic interface 262 is arranged to provide tactile feedback to a user of the client device. For example, the optional haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® Operating System. The operating system may include, or interface with a Java virtual machine module that enables control of hardware components and/or operating system operations via Java application programs.

Memory 230 further includes one or more data storage 244, which can be utilized by client device 200 to store, among other things, applications 242 including browser 245, online and smart client applications and services 246 and Interfaces and Functions Management Interface 247 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store multimedia information and/or content for later publication, editing, or the like, as well as other information including address lists, contact lists, personal preferences, or the like. At least a portion of the content may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), content, and enable telecommunication with another user of another client device. Other examples of application programs include calendars, editors, email clients, IM applications, SMS applications, VOIP applications, contact managers, task managers, transcoders, database programs, word processing programs, security applications, spreadsheet programs, games, search programs, Interfaces and Functions Management application, service or interface and so forth. Applications 242 may further include browser 245. Browser 245 may include virtually any of a variety of client applications configured to receive and/or provide communications of web pages, and other content over a network. Browser 245 typically provides for a graphical display of various web pages, including user interfaces provided, in part, by another computing device over the network. Browser 245 may include a variety of security features, and/or other plug-in applications, modules, applets, scripts, or the like, to enable display of animation, videos, playing of audio files, or the like. Browser 245 and applications 242 are configured to enable a user or sender and/or receiver of Interfaces and Functions and/or associate data and user instructions to communicating with or register, search, match, select, install, subscribe, upload, download, update, upgrade, test, attach, associate and access one or more Interfaces and Functions from/to/on/by/with one or more sources, destinations, web sites, web pages, applications, services, objects, networks, databases, social networking, and devices based on privacy settings and preferences via sending/receiving to/from central server 115 of FIG. 1. Moreover, through one or more of applications 242 or Interfaces and Functions Management Application or Service or Interface 247, the user or sender and/or receiver of Interfaces and Functions Link(s) may send and/or receive Interfaces and Functions Link(s) and associate content or messages or instructions or notifications.

Illustrative Network Device Environment

Figure 3:
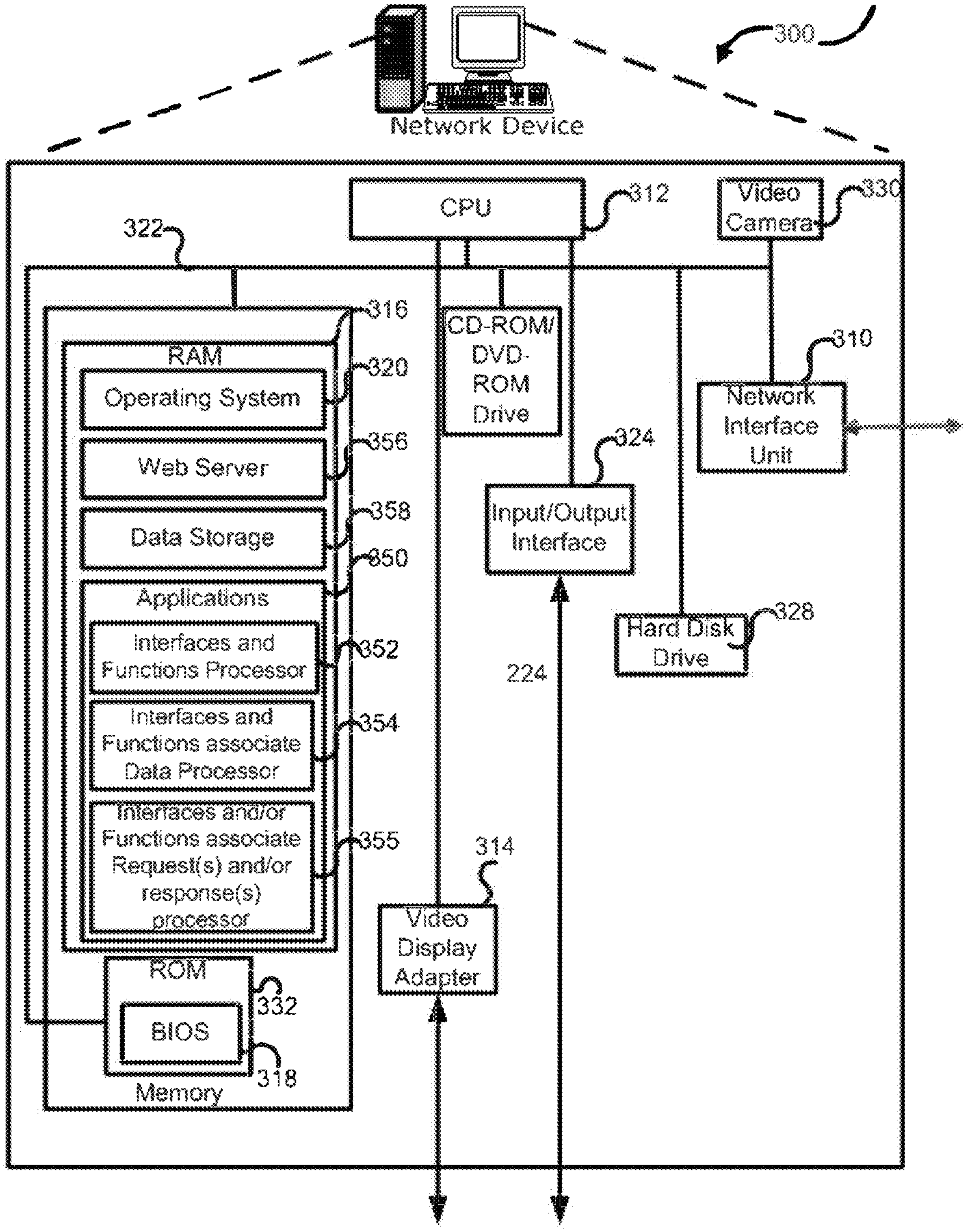
FIG. 3 shows one embodiment of a network device that may be employed in a system implementing the invention.
Figure 6:
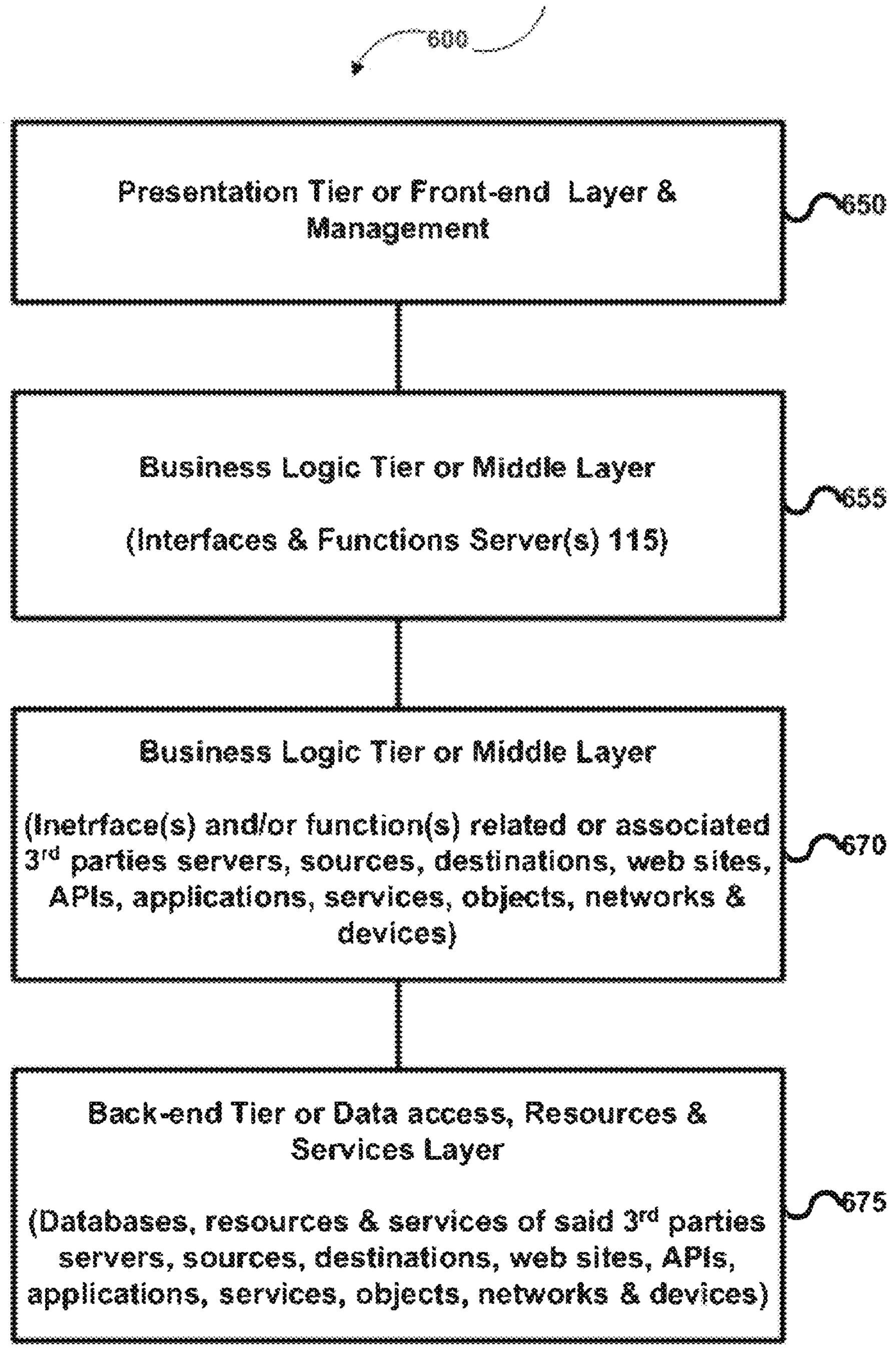
FIG. 6 illustrates new or alternative or supportive or extended or advanced or simplified n-tier interfaces and functions oriented Internet or World Wide Web architecture.

FIG. 3 shows one embodiment of a network device 300, according to one embodiment of the invention. The embodiment of network device 300 illustrated in FIG. 3 may be used to implement the Interfaces and Functions server 115 of FIG. 1. Network device 300 may include many more components than those shown. It may also have less than all of those shown. The components shown, however, are sufficient to disclose an illustrative embodiment for practicing the invention. One or more network devices, and the application programs integrated with the devices, may be used to implement the processes of the present invention, as illustrated in FIGS. 4-6 and discussed herein.

In any event, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account managers, and so forth. More detailed discussions of some application programs are included herein.

Mass memory further includes web server 356, data stores 358, and applications 350. Applications 350 are shown to include Interfaces and Functions Processor 352, Interfaces and Functions associate Data Processor 354 and Interfaces and Functions Request(s) and/or response(s) processor 355. Web server 356 includes virtually any application configured to deliver Web pages and other content to browsers and other client applications via at least the HTTP protocol. However, web server 356 may also be configured to provide scripts, user interfaces, accounting interfaces, editors, security, or the like, to the client application. Moreover, web server 356 may employ a variety of other communication protocols, beyond HTTP. For example, web server 356 may be configured to manage email communication protocols, SMS protocols, IM protocols, or the like. Moreover web server 356 may employ a variety of scripts, applets, programs, or the like, to enable communications of content with a client application.

Data stores 358 may include any of a variety of storage mechanisms, configured to store, and otherwise managed content, applications, scripts, applets, or the like. As such, data stores 358 may be a database, a file structure, or the like. Data stores 358 may store the content into a category structure, such as folders, albums, graphs, trees, or the like, based on a user account, a web service, or the like. In one embodiment, data stores 358 may represent the Data Management services illustrated in FIG. 1, and described in more detail below in conjunction with FIG. 4.

Interfaces and Function Platform 350 is described in more detail below in conjunction with FIGS. 4-6. Briefly, however, Interfaces and Function Platform 350 includes a variety of components to provide web services to a user, including Interfaces and Functions Processor, Interfaces and Functions associate Data Processor, Interfaces and Functions Request(s) and/or response(s) processor, Management Interface, search tools, user interfaces, services plug-and-play modules, or the like. Various embodiments of example user interface screens are described in more detail below.

In one embodiment, applications 350 may include Interfaces and Functions Processor 352. An Interfaces and Functions Processor may include program logic that performs actions in response to receiving requests for presenting Interfaces and Functions and Link(s) of Interfaces and Functions and associated data from user(s) or sender(s) client device. These actions may include determining a selected interface(s) and/or associate function(s) or selected function(s) and associate interface(s).

In one embodiment, applications 350 may include Interfaces and Functions associate Data Processor 354. An Interfaces and Functions associate Data Processor may include program logic that performs actions relating to receiving and processing communications or data related to interactions of users or connected users of users with Interfaces and Functions. These actions may include receiving and collecting responses, user interaction data, associating advertising, applying validation, spam control, limits and presentation and privacy settings, preparing Interfaces and Functions associate response to be sent to the receivers and/or provider(s), or other actions relating to processing communication and responses. These actions are discussed in further detail herein. Though FIGS. 4-6 illustrate Interfaces and Functions Processor, Interfaces and Functions associate Data Processor and Interfaces and Functions Request(s) and/or response(s) processor, the actions and logic of each component may be combined into a single component, divided into multiple components in a different manner, or distributed in a variety of ways across multiple network devices.

Illustrative Operating Environment

Rich (smart) client, a Web client, or a rich Internet application (RIA), Website, Web Page and smart client Architecture (pre-loaded interfaces and/or functions).

FIG. 4 illustrates in one embodiment Interfaces and Functions Management user interface(s) or application(s) or service(s) which are provided and/or connected or enabled to connected with Interfaces and Functions Server(s) 115 and/or one or more Interfaces and Functions Provider(s)' Server(s) 150 via one or more types of network(s) 120. User can use, access, download, subscribe, register one or more types of clients including rich or smart client application, offline or connected client, online client of Interfaces and Functions Management from one or more types of devices including smart phones, desktop personal computer and smart devices, wherein said clients and devices can use one or more types of networks, hard wares, software, embedded systems, operating systems, applications, services, components, objects, executable instructions and browsers.

In one embodiment illustrated Interfaces and Functions Management can enable user to use plurality types of ready to use, dynamic, run time customized or personalized and generated or created or provided or presented interface(s) by users(s) and/or 3rd parties including experts, providers, developers and connected or related user(s) of user(s). Users are enabled to search, match, select, register, download, install, attach, subscribe, use and access one or more interfaces and/or functions. Users can directly enter name of interface(s) 401 and invoke one or more corresponding identified interface(s). In another embodiment users are provided an auto complete or word completion text box for easily entering the name of interface(s). In addition other embodiment users are provided with other types of controls for selection of Interface(s) name(s) including menus, combo box (403) and tab control 410. Users can select categories or sub-categories or taxonomies 404 for selecting various Interfaces. Users can also switch various Interfaces via tab control. In another embodiment users can concurrently or simultaneously use various Interfaces and/or selected function(s) (not shown in figure). Users can at the same time open or invoke or use or access one or more types of one or more interfaces from same or separate windows or browsers or interfaces and can use, select and apply one or more types of one or more functions for one or more types of activates, actions, transactions, events, communications, messaging, searching, posting, responding, publishing, workflows, tasks, interactions, searching, sharing, processing, saving and requesting. User can also use full features search 402 to search, match one or more interface(s) provided by one or more sources, developers, providers, advertisers, sponsors, experts, users of networks, web sites, web pages, applications, services, networks, social networks, peer to peer networks, local networks, locally stored, databases, devices, servers and via API and webs services. User can also use advance search to search interfaces based on one or more keywords, Boolean operators, preferences, matchmaking preferences, privacy settings, conditions, criteria, rules, selections, and wizards. Users can select one or more Interfaces from one or more search results and can bookmark, further filter and sort search results based on one or more criteria, save search results, register, make payment, attach, download, install and subscribe one or more selected Interfaces. For example User selected exemplary interface 412 via illustrated switchable tab 410 or input textbox 401 or search button 402 or selective combo box 403 enables user to use preferred or selective interface "Message" and Message Interface 412 enable user to input text or message and use various Message Interface 412 associate features including full features editor options like spell checking, autocomplete textboxes, command selections and various editing, text inputting, text processing and other types of options (not shown in figure).

After selecting and using Interface(s) user can search, match, register, subscribe, make payments, download, install, select 415, use, access, invoke, apply, orchestrate, attach, associate one or more or group(s) or list(s) or sequence of function(s) with/for/to one or more Interface(s) provided by one or more sources including Interface(s) and Function(s) server(s), users of networks, 3rd parties, providers, developers, experts, users, web sites, applications, services, networks, databases, servers and devices. User can input function name to text box 420 or select categories or sub-categories or taxonomies via combo box 422 and/or select from combo box 423 or use list 425 or 430 or menu or tab(s) of functions to search 427, match, auto match, filter, sort, select, use, access, execute, use, invoke, attach, associate, apply one or more functions and/or links of features for one or more selected or identified Interface(s). User can also create categories of functions and provide name, keywords and metadata to each created list(s) and apply privacy settings and preferences to one or more functions or list(s) of functions.

In this example, when user selects Message Interface 412 and compose or input contents 413 and selects "Select or Apply Function(s)" button, then user is presented with list of functions or user can directly selects function(s) from list(s) of function(s) and apply or use one or more functions for one or more activities. For example, when user selects function "Send Message To particular group(s)", user is enabled to select one or more preferred group(s) from list of groups, when user selects function "Send E-mail To particular person", user is enabled to use email interfaces and features associate with that function select email addresses from list of e-mail contacts, when user selects function "Send IM To particular users", user is enabled to send instant message(s) to one or more selected users or group(s) of users or user can use one or more features of Instant Messenger, when user selects function "Publish To particular destination", then user is enabled to select from one or more destination where user wants to publish shared contents and when user selects function "Save To particular destinations" then user is enable to save contents or take backup of contents to one or more places including databases, applications, services, web sites, web pages, devices, servers, features of web site(s).

In another embodiment users can search, match, select one or more functions from list of functions 440 for applying or associating or integrating, attaching 450 one or more functions with one or more selected interface(s) 410 or 412 and execute 450 functions for one or more selected interfaces 410 or 412. Users can share, sort and categorize one or more functions from list of functions. Users can draft or save and execute later option 450 including select interfaces, input or select contents or selections or sue interface(s) associate features and apply one or more functions and execute that function(s) on said interface(s) later. For example, user draft message 413 via selected interface 412 and apply various functions from list 440 including "Sent message To selected group", "Send E-mail to particular addresses", "Send IM to particular users", "Publish contents to particular web sites or destinations" and "Save contents to particular sources or databases" and execute said selected set of functions for or on said contents 413 later.

In another embodiment user is presented with auto matched or contextual or user or system associated or related list(s) of functions or frequently used or suggested list(s) of functions or user and/or connected users of network(s) or expert(s) user can determined one or more function(s) or list(s) of function(s) for one or more selected interface(s).

In another embodiment user or on behalf of user 3rd parties experts, developers and users of networks is/are enabled to customize, edit, and update one or more interface(s), interface(s) associate features, interfaces, objects, contents, source code, rules, fields and presentation layer and functions and function associate interface(s), applications, services, metadata, contents and objects based on associate privacy settings, preferences and enablement of customization.

In another embodiment users can view one or more types of response(s) related to each function(s) via clicking on each function or on separate interface users can view responses associated with each function and/or interfaces from one or more sources. Users are notified of the number of responses received by each function and/or set of function(s) and/or interface(s). Users can view categories wise, function wise, interface wise, function type wise, interface type wise, content type wise responses. Users can also use various dedicated interfaces and/or features of function(s) for viewing, responding, take one or more actions or further user actions, use feature(s) and processing responses.

In another embodiment users can use function(s) without interface(s) or use interface(s) without applying function(s). For example users can request only "About Us" or "Contacts" of a particular website and can view "About Us" or "Contacts" webpage of that website. In another example users can request the price of a particular product from more than one source and receive prices from requested sources and are able to apply one or more functions like compare, rank, sort, calculate, and analyze.

In another embodiment user and access can use one or more functions without using Interface(s) and/or user can use one or more Interface(s) without using function(s).

In another embodiment user, developer, administrator, service providers, advertisers can create, define, develop, generate, customize, personalize, programmed, and develop one or more applications, services, functions, features, interfaces, web sites, web pages and portals by using, accessing, selecting, searching, matching, registering, making of payments for purchase or use or access, downloading, installing, customizing including dynamically re-structuring forms or interfaces and databases, requesting customization to providers, subscribing, ordering, applying privacy settings and preferences, orchestrating, attaching one or more functions and/or interfaces and associate features, sub-functions, applications, services, interfaces, objects, source or binary code or instructions, databases, multimedia contents, metadata, system data from one or more sources.

In another embodiment function(s) and/or interfaces can use one or more APIs, web services, databases, objects, applications, services, networks, contents, resources including computing resources of one or more sources, websites, portals, applications, services, servers, providers, developers by using one or more communication links.

In another embodiment function(s) and/or interface(s) can search, match, select, register, make payment for purchase or use or access, install, subscribe, download, upload, attach, associate, apply privacy settings, privacy policies and preferences, un-register, un-install, update, upgrade, integrate, plug-in, access, use, share, publish, present, collaborate, host, execute, process, format and store at/from/to/on/by/in/with 3$^{rd}$ parties' websites, web pages, applications, services, databases, networks and devices.

In another embodiment, when user selects function(s), system presents various function associate applications, services, databases, forms, user interfaces for inputting and/or selecting one or more selections and contents including parameters, selecting list of sources, e-mail addresses and user connections or contacts, filling of various forms, applying privacy settings and preferences, inputting user identity and password or login information, inputting or selecting payment information, selecting or inputting metadata, selecting various controls including lists, combo boxes, text boxes, menus, radio buttons, check boxes, buttons and like.

In another embodiment user can use interfaces management 405 for searching, matching, selecting, filtering, registering, making payments for purchasing, installing, downloading, uploading, subscribing, attaching, associating, categorizing, ordering, sorting, customizing, sharing, referring and requesting for customization or development of interfaces and associate features.

In another embodiment user can use functions management 406 for searching, matching, selecting, filtering, registering, making payments for purchasing, installing, downloading, uploading, subscribing, attaching, linking, integrating, orchestrating, associating, categorizing, ordering, sorting, customizing, sharing, referring, applying or associating with interface(s), executing function(s) for interface(s) and requesting for customization or development of functions and associate interfaces, applications, services, objects, sources, databases, functions and features.

In another embodiment user can use content management 407 for using, accessing, sharing, synchronizing user generated one or more types of contents including text, videos, images, URLs or links, photos, binary objects, documents and files, system generated, received and saved contents from one or more sources or functions or interfaces and shared contents for/with/in one or more interfaces and/or functions or sharing with connected or related users of networks(s), other users of networks, applications, services, communication channels, databases, networks, social networks, web sites, web pages portals, profiles, and devices.

In another embodiment user can use contacts or connections management 408 for searching, matching, categorizing, sorting, filtering, adding, creating, importing, inviting, requesting, applying privacy settings, updating one or more contacts and connections and using, accessing, sharing, synchronizing, referring, exporting, searching, matching, selecting, applying one or more connections for one or more functions and/or interfaces.

In another embodiment user can privacy settings and preferences management 409 for applying privacy settings and preferences for one or more functions and/or interfaces.

FIG. 5 illustrates list(s) of functions 510 and associate options 550 which is part of list of functions FIG. 4-440.

FIG. 6 explains new internet or www architecture proposed or invented by present invention. This multi-tier or n-tier Internet or Network Architecture, which is alternate to present worldwide web, includes standardized applications, services, data structures, interfaces and functions. Instead of developing, hosting, using, accessing, registering, installing, downloading, uploading, updating, upgrading, searching, matching, selecting, purchasing, subscribing, heterogeneous types of internet or internet enabled web sites, applications, services, functions, data structures, databases, objects and web services, present invention enables system and method for providing standardized, generalized, re-usable, re-distributable, time, money and energy saving, dynamic, user friendly, customized, attachable, personalized, multi-purpose, ready to use, multi functions enabled, multi sources compatible, collaborative enabled, and unified interfaces(s), data structures and functions oriented internet.

Presentation and Front-end Tier or Layer or Management 650 includes or enables presenting of one or more types of unified, dynamic, generalized, collaborative enabled and standardized user interface(s) from one or more sources including developers, providers, advertisers, sponsors, web sites, portals, applications, services, databases, networks, servers and devices. Users are enabled to search, match, select, register, purchase, install, download, subscribe, attach, categories, filter, sort, order, orchestrate, integrate, share, save, synchronize, import, refer, organize, customize, program, personalize, associate and apply metadata, privacy settings, preferences and data to/with interface(s) and use interface(s) associate features, interfaces, selection controls, forms, objects, applications, services, system data, metadata and user data. Users are also enabled to search, match, select, register, purchase, install, download, subscribe, categories, filter, sort, order, orchestrate, integrate, link, share, save, synchronize, import, refer, organize, customize, program, personalize, associate and apply metadata, privacy settings, preferences and data to/with function(s), use function(s) associate features, interfaces, selection controls, forms, objects, applications, services, system data, metadata and user data and associate, attach, use, apply and execute one or more function(s) with/for/via/on/in/by one or more Interface(s). Presentation layer also presents all types of responses and/or requests from one or more sources at the general interface(s) and or corresponding interface(s) to the user. For example when a user posts a question and receives an answer then answer(s) is/are presented to the "Q and A" application or interface to the user. So users can take further actions including providing ranks and comments on received answer(s). Presentation layer also presents logs, reports, accounts, analytics and statistics of all types of activities, actions, interactions, events, transactions, usage, workflows, responses, requests, communications, sharing, searching, publishing and like.

Business Logic or Processing or Middle Tier or Layer or Management 655 of Interfaces and Functions Server(s) 115 includes or enables formatting, structuring, mapping, converting to various formats or syntax or languages or data types or fields, verifying, validating, authenticating, authorizing, identifying, connecting and processing of Interface(s) and/or function(s) associated user selections and contents including selected, auto matched, determined sources, destinations, servers, connection names, parameters, user identity, password, roles, credentials, login information, payment information, privacy settings, preferences, rules, system data, metadata, user data and profile, fields and/or sending or processing formatted request(s) and/or receiving response(s) as per interface(s) associated function(s) to/from various sources/destinations via one or more APIs, Web services and one or more types of communication links and networks.

Business Logic or Middle Tier or Layer or Management of Interface(s) and/or Function(s) associated 3rd parties' servers, sources, destinations, web sites, APIs, applications, services, networks and devices includes identified, selected, matched, and authorized categories, type, domain or subject request associated sources specific web sites, applications, services and servers 670 includes or enables processing of received request(s), mapping, formatting, indexing, structuring, identifying and converting of associated contents to various compatible formats or syntax or languages or data types or fields, verifying, validating, authenticating, authorizing and connecting request(s) sender(s) and request associated contents, storing, saving, publishing and presenting of contents at appropriate places including one or more databases, storage mediums, applications, services, features, web pages, profile(s) of user or connected users of user, connecting request sender(s) with requested user(s) of web sites, servers, databases, applications, services and devices for communication, messaging, sharing and participation with various activities.

Data access and Resource or Service or Back-end Tier or Layer or Management including databases, resources and services of said request associated sources, category, type, domain and subject specific identified, matched and authorized web sites, applications, services and servers 675 includes or enables to prepare responses for request sender as per preferences of request sender including preferred Interface(s), device, format, language to receive or accept responses, date and time and other preferences and/or enable request sender to access, view, receive authorized data, contents, status and resources including messages, answers, payment details, invoices, news, posted jobs, products details, notifications, replies, search results, link(s) of accessible objects, downloadable applications, multimedia contents including videos, images, photos, URLs and profiles and any types of responses sent by users, servers, web sites, applications, services, databases and devices.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. Additionally, although the foregoing embodiments have been described in the context of a social network website, it will be apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plugins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

What is claimed is:

1. A computer-implemented method for distributing and installing web application, comprising:

enabling a user to access, via a client device application including web browser application, one or more online accessible as well as installable platform independent applications, published by providers via respective provider server system, wherein an application comprise one or more interfaces and an interface comprises associated interface data, wherein the interface includes webpage;

in response to determining the application is installable based on application associated metadata, further enabling the user to install the application in a client device storage medium;

receiving, from the client device application including the web browser application, instruction to install a selected application in the client device;

retrieving, from the provider server system, and storing in the client device storage medium, the selected application;

installing and configuring the selected application, on the client device, for enabling the user to select and open the installed application from the client device in a separate standalone window or in response to determining the application is installed based on the application associated metadata, further enabling the user to open the installed application from the web browser and access or open the associated one or more interfaces;

receiving and storing by the client device storage medium, from the provider server system, updated interface data and application related notifications; and further enabling the user to uninstall the application.

2. The computer-implemented method of claim 1, further comprising preparing or generating a requested interface from among the one or more interfaces associated with the installed application based on the interface data associated with the requested interface.

3. The computer-implemented method of claim 1, further comprising presenting in a presentation process via an operating environment, a requested interface from among the one or more interfaces associated with the installed application according to the interface data associated with the requested interface.

4. The computer-implemented method of claim 1, further comprising preparing or generating a requested interface based on updated interface data associated with the requested interface.

5. The computer-implemented method of claim 3, further comprising receiving by the presentation process via the operating environment, updated interface data for a portion of the one or more interfaces associated with the installed application.

6. The computer-implemented method of claim 5, further comprising presenting, in the presentation process, the portion of the interface according to the updated interface data.

7. The computer-implemented method of claim 1, further comprising enabling upload, via a graphical user interface, of the one or more applications or one or more updated applications to a server storage medium for publishing or listing, wherein uploading the one or more applications for publishing or listing includes making the one or more applications accessible via a uniform resource locator (URL) or control, such that the one or more applications are searchable and installable.

8. The computer-implemented method of claim 1, further comprising retrieving and storing, by the server system, in a local storage medium, one or more updated interfaces associated with the selected application, including updated interface data associated with each of the one or more updated interfaces.

9. The computer-implemented method of claim 1, wherein publishing or listing the one or more applications enables searching, via a graphical user interface, the one or more applications.

10. The computer-implemented method of claim 1, wherein the interface data comprises one or more of: interface structures logic codes including HyperText Markup Language (HTML); interface presentation logic codes including Cascading Style Sheets (CSS); interface related program logic codes including JavaScript; extensible Markup Language (XML); data; one or more types of content including graphics, text, video, multimedia, files; or one or more types of digital controls, objects and components.

11. A system comprising:

a processor;

a memory coupled to the processor and storing instructions that, when executed by the processor, cause the system to perform operations comprising:

enable a user to access, via a client device application including web browser application, one or more online accessible as well as installable platform independent applications, published by providers via respective provider server system, wherein each application comprises one or more interfaces, and each interface comprises associated interface data, wherein the interface includes a webpage;

in response to determining the application is installable based on application associated metadata, further enabling the user to install the application in a client device storage medium;

receive from the client device application including the web browser application, instruction to install a selected application in the client device;

retrieve, from the provider server system, and storing in the local client device storage medium, the selected application;

install and configure the selected application, on the client device, for enabling the user to select and open the installed application from the client device in a separate standalone window or in response to determining the application is installed based on the application associated metadata, further enabling the user to open the installed application from the web browser and access or open the associated one or more interfaces;

receive and store by the client device storage medium, from the provider server system, updated interface data and application related notifications; and further enable the user to uninstall the application.

12. The system of claim 11, further comprising preparing or generating the requested interface based on the interface data associated with the requested interface.

13. The system of claim 11, further comprising presenting in a presentation process via an operating environment, the requested interface according to the interface data associated with the requested interface.

14. The system of claim 11, further comprising preparing or generating the requested interface based on associated updated interface data.

15. The system of claim 13, further comprising receiving, by the presentation process via the operating environment, updated interface data for a portion of the requested interface.

16. The system of claim 15, further comprising presenting, in the presentation process, the portion of the requested interface according to the updated interface data.

17. The system of claim 11, further comprising enabling upload, via a graphical user interface, the one or more applications or one or more updated applications to a server storage medium, wherein uploading the one or more applications for publishing or listing includes making the one or more applications accessible via a uniform resource locator (URL) or control, thus making the one or more applications searchable and installable.

18. The system of claim 11, wherein retrieving and storing, by the server system, in the client device storage medium, the selected application includes retrieving and storing one or more updated interfaces associated with the selected application including updated interface data with each of the one or more updated interfaces.

19. The system of claim 11, wherein publishing or listing the one or more applications enables searching, via graphical user interface, the one or more applications.

20. The system of claim 11, wherein the interface data comprises one or more of: interface structures logic codes including HyperText Markup Language (HTML); interface presentation logic codes including Cascading Style Sheets (CSS); interface related program logic codes including JavaScript; extensible Markup Language (XML); data; one or more types of content including graphics, text, video, or multimedia, files; one or more types of digital controls, objects and components.

21. The computer-implemented method of claim 1, further comprising the installed applications include executable instructions that, when executed, cause a launch of a selected application in a separate window as standalone application for display using the web browser application, wherein said standalone application works in online and offline mode.

22. The computer-implemented method of claim 1, further comprising in response to selecting install, client device web browser application integrated install control including button, link, menu item, icon image and user interface, receiving instruction from the client device user, to install the selected application; and installing the selected application in the client device storage medium.

23. The computer-implemented method of claim 1, further comprising in response to selecting install control including button, link, menu item, icon, image and user interface, receiving instruction, from the client device, to install the selected application; and installing the selected application in the client device storage medium.

24. The computer-implemented method of claim 1, further comprising receiving, by the client device, installed application associated notifications without need to open installed application and enabling user to access notifications associated with said installed application from the client device or from the separate notification or response application of the client device.

25. The computer-implemented method of claim 1, further comprising enabling the user to un-install the selected installed application.

26. The computer-implemented method of claim 1, further comprising receiving instructions from the user of the client device, to install and configure a selected application on the client device; communicating one or more parameters associated with the selected application to an application programming interface of the client device for configuring the selected application on the client device, wherein the one or more metadata, system data and parameters associated with the application comprises an icon, a name, a category and a Uniform Resource Locator (URL) of the selected application, privacy policies including use, present or make available or installable for users, advertisements including description, screenshot, photo, video, offer, user data and terms & agreements of access, documents, license, helps including how to use application.

27. The computer-implemented method of claim 1, further comprising invoking or opening installed application via selecting control or link or Uniform Resource Locator (URL) or name of the selected application or inputting link or Uniform Resource Locator (URL) or name of the application or by using auto completion or word completion text box entering name of the application and via one or more types of controls for selection of application name including menus, combo box, tab control and user interface.

28. The computer-implemented method of claim 1, further comprising in response to receive request, from the client device browser application, to access web application serving requested application including web application using Hypertext Transfer Protocol Secure (HTTPS) protocol.

29. The computer-implemented method of claim 1, further comprising receiving search query to search contents or application(s); displaying search results including searched application(s) and each application associated details and link or uniform resource locator (URL) or control including button, image, icon, menu item, user interface for accessing and installing selected application(s).

30. The computer-implemented method of claim 1, further comprising enabling the user to bookmark one or more selected applications.

31. The computer-implemented method of claim 1, further comprising enabling the user to share one or more selected applications or Uniform Resource Locator (URL) of one or more selected application(s).

32. The computer-implemented method of claim 1, further comprising dynamically and automatically updating the application including web application, wherein dynamically and automatically updating the application includes dynamically and automatically updating one or more portions of the application stored in the client device storage medium.

33. The system of claim 11, further comprising the installed applications include executable instructions that, when executed, cause a launch of a selected application in a separate window as standalone application for display using the web browser application, wherein said standalone application works in online and offline mode.

34. The system of claim 11, further comprising in response to selecting install, client device web browser application integrated install control including button, link, menu item, icon, image and user interface, receiving instruction from the client device user, to install the selected application; and installing the selected application in the client device storage medium.

35. The system of claim 11, further comprising in response to selecting install control including button, link, menu item, icon, image and user interface, receiving instruction, from the client device, to install the selected application; and installing the selected application in the client device storage medium.

36. The system of claim 11, further comprising receiving, by the client device, installed application associated notifications without need to open installed application and enabling user to access notifications associated with said installed application from the client device or from the separate notification or response application of the client device.

37. The system of claim 11, further comprising enabling the user to un-install the selected installed application.

38. The system of claim 11, further comprising receive instructions from the user of the client device, to install and configure a selected application on the client device; communicate one or more parameters associated with the selected application to an application programming interface of the client device for configuring the selected application on the client device, wherein the one or more metadata, system data and parameters associated with the application comprises an icon, a name, a category and a Uniform Resource Locator (URL) of the selected application, privacy policies including use, present or make available or installable for users, advertisements including description, screenshot, photo, video, offer, user data and terms & agreements of access, documents, license, helps including how to use application.

39. The system of claim 11, further comprising invoke or open installed application via selecting control or link or Uniform Resource Locator (URL) or name of the selected application or inputting link or Uniform Resource Locator (URL) or name of the application or by using auto completion or word completion text box entering name of the application and via one or more types of controls for selection of application name including menus, combo box, tab control and user interface.

40. The system of claim 11, further comprising in response to receive request, from the client device browser application, to access web application serving requested application including web application using Hypertext Transfer Protocol Secure (HTTPS) protocol.

41. The system of claim 11, further comprising receiving search query to search contents or application(s); displaying search results including searched application(s) and each application associated details and link or uniform resource locator (URL) or control including button, image, icon, menu item, user interface for accessing and installing selected application(s).

42. The system of claim 11, further comprising enable the user to bookmark one or more selected applications.

43. The system of claim 11, further comprising enable the user to share one or more selected applications or Uniform Resource Locator (URL) of selected application(s).

44. The system of claim 11, further comprising dynamically and automatically updating the application including web application, wherein dynamically and automatically updating the application includes dynamically and automatically updating one or more portions of the application stored in the client device storage medium.

* * * * *